United States Patent
Herber et al.

(10) Patent No.: US 9,397,514 B2
(45) Date of Patent: Jul. 19, 2016

(54) DC POWER SIGNAL GENERATION FOR ELECTRO-CHEMICAL REACTOR

(71) Applicant: BakerCorp, Seal Beach, CA (US)

(72) Inventors: Douglas J. Herber, San Marcos, TX (US); Mark Sullivan, Houston, TX (US)

(73) Assignee: BAKERCORP, Seal Branch, CA (US)

( * ) Notice: Subject to any disclaimer, the term of this patent is extended or adjusted under 35 U.S.C. 154(b) by 184 days.

(21) Appl. No.: 14/209,489

(22) Filed: Mar. 13, 2014

(65) Prior Publication Data

US 2014/0266074 A1  Sep. 18, 2014

Related U.S. Application Data

(60) Provisional application No. 61/792,973, filed on Mar. 15, 2013.

(51) Int. Cl.
  *H02J 7/00*  (2006.01)
  *H02M 3/00*  (2006.01)
  *H02M 3/28*  (2006.01)

(52) U.S. Cl.
  CPC .............. *H02J 7/007* (2013.01); *H02M 3/00* (2013.01); *H02M 3/285* (2013.01)

(58) Field of Classification Search
  CPC ......... H02J 7/007; H02M 3/00; H02M 3/285; Y02B 70/126
  USPC .......................................................... 320/166
  See application file for complete search history.

(56) References Cited

U.S. PATENT DOCUMENTS

| | | | |
|---|---|---|---|
| 3,518,174 A | | 6/1970 | Kiyoshi |
| 3,735,014 A | * | 5/1973 | Turner ............... G10H 1/00 84/680 |
| 4,507,533 A | | 3/1985 | Inoue |
| 4,783,728 A | | 11/1988 | Hoffman |

(Continued)

FOREIGN PATENT DOCUMENTS

| | | |
|---|---|---|
| JP | 2006312758 | 11/2006 |
| WO | 2005001164 A1 | 1/2005 |
| WO | 2005111484 | 11/2005 |

OTHER PUBLICATIONS

International Search Report and Written Opinion issued on Jul. 10, 2014 in PCT/US14/26474.

*Primary Examiner* — Vuthe Siek

(74) *Attorney, Agent, or Firm* — Jeffer Mangels; Butler & Mitchell LLP; Brennan C. Swain, Esq.

(57) ABSTRACT

Various systems, processes, and techniques may be used for converting alternating current power to direct current power for an electro-chemical reactor. In certain implementations, a system and a process may include the ability to receive an alternating current power signal, convert the alternating current signal to a direct current signal, and distribute the direct current signal to at least two power conversion modules coupled to a mounting structure. Each power conversion module may be able to convert a portion of the direct current signal to a high-frequency alternating current signal, adjust the voltage of the high-frequency alternating current signal, convert the voltage-adjusted high-frequency alternating current signal to a direct current power signal, and filter the direct current power signal. The system and the process may include the ability to combine the direct current power signals from the modules into an output direct current power signal for an electro-chemical reactor.

19 Claims, 11 Drawing Sheets

(56) References Cited

U.S. PATENT DOCUMENTS

| | | |
|---|---|---|
| 4,992,156 A | 2/1991 | Silveri |
| 5,587,057 A | 12/1996 | Metzler |
| 5,771,163 A | 6/1998 | Moriguchi |
| 5,840,172 A | 11/1998 | Zugravu |
| 5,877,952 A | 3/1999 | Moriguchi |
| 6,146,515 A | 11/2000 | Gutierrez |
| 6,178,102 B1 | 1/2001 | Stanley |
| 6,582,592 B2 | 6/2003 | Arnaud |
| 6,608,404 B2 | 8/2003 | Schienbein |
| 6,754,090 B2 | 6/2004 | Arai |
| 6,803,746 B2 | 10/2004 | Aker |
| 6,812,586 B2 | 11/2004 | Wacknov |
| 7,075,032 B2 | 7/2006 | Karino |
| 7,286,556 B1 | 10/2007 | Jackson |
| 7,339,808 B2 | 3/2008 | Alexander |
| 7,453,170 B2 | 11/2008 | Kunow |
| 7,518,266 B2 | 4/2009 | Eckroad |
| 7,615,893 B2 | 11/2009 | Biester |
| 7,706,152 B2 | 4/2010 | Shen |
| 7,957,164 B2 | 6/2011 | Kidokoro |
| 8,072,008 B2 | 12/2011 | Mukasa |
| 8,227,127 B2 | 7/2012 | Little |
| 8,329,350 B2 | 12/2012 | Lam |
| 8,333,873 B2 | 12/2012 | Tremblay |
| 8,347,960 B2 | 1/2013 | Mothersbaugh |
| 8,374,013 B2 | 2/2013 | Xu |
| 8,398,829 B1 | 3/2013 | Tarbet |
| 8,503,199 B1 | 8/2013 | Chapuis |
| 8,540,863 B2 | 9/2013 | Mothersbaugh |
| 2004/0160216 A1 | 8/2004 | Speranza |
| 2006/0120001 A1* | 6/2006 | Weber ............... H02M 7/003 361/103 |
| 2007/0096696 A1 | 5/2007 | Lefley |
| 2007/0291514 A1 | 12/2007 | Shen |
| 2008/0037290 A1 | 2/2008 | Suzuki |
| 2008/0296173 A1 | 12/2008 | Mishra |
| 2010/0272630 A1 | 10/2010 | Rosenbaum |
| 2011/0006600 A1 | 1/2011 | Fontana |
| 2011/0089693 A1 | 4/2011 | Nasiri |
| 2012/0119591 A1 | 5/2012 | Sun |
| 2012/0170175 A1 | 7/2012 | Silberbauer |
| 2012/0206946 A1 | 8/2012 | Sagneri |
| 2013/0009484 A1 | 1/2013 | Yu |
| 2013/0228331 A1 | 9/2013 | Mothersbaugh |
| 2013/0233703 A1 | 9/2013 | Kaspar |

* cited by examiner

DC POWER SIGNAL GENERATION FOR ELECTRO-CHEMICAL REACTOR

CROSS REFERENCE TO RELATED APPLICATIONS

This application claims the benefit of U.S. Provisional Application No. 61/792,973 filed Mar. 15, 2013, which is incorporated herein by reference in its entirety.

FIELD OF THE INVENTION

The present invention relates to a DC power signal generator for an electro-chemical reactor.

BACKGROUND OF THE INVENTION

Electro-chemical reactors have a variety of uses (e.g., electro-coagulation, electro-phoresis, electrolysis, and electro-plating, among others). Electro-coagulation, for example, is an electro-chemical process that simultaneously removes heavy metals, suspended solids, emulsified organics and many other contaminants from water using electricity instead of expensive chemical reagents. Basically, electro-coagulation uses electricity and sacrificial plates to combine with contaminants in a waste stream, producing insoluble oxides and hydroxides (commonly known as floc) that are easily separated from the clear water.

Electro-chemical processes like electro-coagulation and electro-plating often require a large direct current (e.g., 50-5,000 Amps) at a relatively low amount of voltage (e.g., 50 Volts). The most common way to produce the large direct current is by supplying commercial power (e.g., 120 V, 1 phase or 420 V, 3 phase) to a rectifier. Common commercially-available rectifiers include a transformer to down convert the voltage and increase the amperage, a rectifier, typically composed of a number of diodes, to convert the alternating current signal to a direct current signal, and a filter to smooth the direct current signal.

SUMMARY OF THE PREFERRED EMBODIMENTS

This disclosure relates to power converter systems, processes, and techniques for converting alternating current power to direct current power for an electro-chemical reactor. In certain implementations, a process for a power converter for converting alternating current power to direct current power for an electro-chemical reactor may include the ability to receive an alternating current power signal, convert the alternating current power signal to a direct current signal, and distribute the direct current signal to at least two power conversion modules coupled to a mounting structure. Each power conversion module may be able to convert a portion of the direct current signal to a high-frequency alternating current signal, adjust the voltage of the high-frequency alternating current signal, convert the voltage-adjusted high-frequency alternating current signal to a direct current power signal, and filter the direct current power signal. The process may also include combining the direct current power signals from the modules into an output direct current power signal for an electro-chemical reactor.

Various implementations may include one or more features. For example, because power conversion modules may be added and subtracted as needed, power conversion may be readily scaled to the electro-chemical reactor. Thus, as opposed to having to have different sized power conversion systems for different applications, one system may be able address a number of applications. The scalability also provides for increased power efficiency as compared to prior devices because power that is not used is not dissipated. Moreover, if a power conversion module fails, it may be readily replaced. As another example, by converting a relatively high-frequency signal, fewer losses occur due to higher frequency harmonics. Prior systems typically use phase angle control when rectifying a signal, and this leads to the generation of a relatively large amount of heat to due high frequency harmonics. The higher frequency also allows components to be made smaller relative to prior systems, which helps to reduce size and weight. As a further example, a wider variety of input signals may be accepted as controlled AC signals are generated on the modules and converted to output DC power signals.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
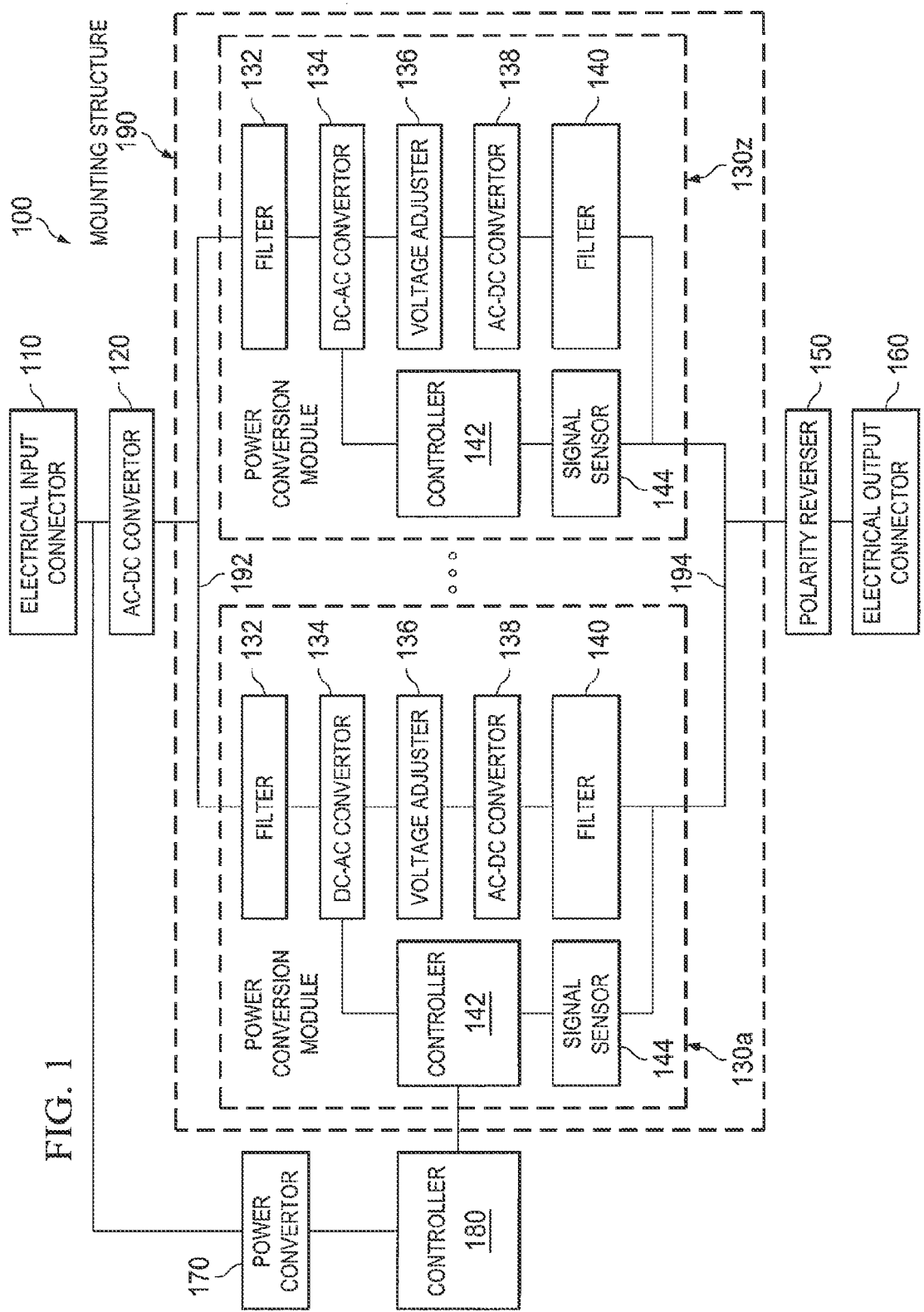
FIG. 1 is a block diagram illustrating selected components of an example system for generating a DC power signal for an electro-chemical reactor.

The following description and drawings are illustrative and are not to be construed as limiting. Numerous specific details are described to provide a thorough understanding of the disclosure. However, in certain instances, well-known or conventional details are not described in order to avoid obscuring the description. References to one or an other embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

FIG. 1 illustrates an example system 100 for generating a DC power signal for an electro-chemical reactor. System 100 is generally contained within a single unit (e.g., in a single housing) but may dispersed between multiple units if needed.

On the power input side, system 100 includes an electrical input connector 110 and an alternating current to direct current (AC-DC) convertor 120. Electrical input connector 110 may, for example, be a standard device by which electrical equipment may be coupled to commercial power (e.g., 208 V, 3 phase; 277 V, 3 phase; 460 V, 3 phase; 480 V, 3 phase; 600 V, 3 phase; 120 V, 1 phase; or 240 V, 1 phase). AC-DC convertor 120 is coupled to electrical input connector 110 and converts alternating current (AC) electrical power received through the electrical input connector 110 into a direct current (DC) signal. AC-DC convertor 120 may, for example, be a rectifier. If the incoming current is 3 phase, AC-DC convertor 120 may, for instance, be a 3 phase, full bridge rectifier. AC-DC convertor 120 could, for example, include 6 diodes in a bridge. The voltage produced by AC-DC convertor 120 depends on application, but in some instance it may be in the range of 650-750 V.

System 100 includes a number of power conversion modules 130. Each power conversion module 130 may produce a given amount of power (e.g., 100 Amps at 48 Volts or 200 Amps at 48 Volts and so on), and, thus, the number of power conversion modules 100 may be varied depending on the needs to the electro-chemical reactor, as one of skill in the art would understand. The DC signal may be distributed to the power conversion modules by a bus 192. Bus 192 may, for example, be one or more pairs of conduits (e.g., wires or bars).

On the input side, each power conversion module 130 includes a filter 132 and a direct current to alternating current (DC-AC) convertor. Filter 132 filters the DC signal from AC-DC convertor 120. Filter 132 may, for example, be composed of one or more capacitors. DC-AC convertor 134 is coupled to filter 132 and receives the filtered DC signal. DC-AC convertor 134 converts the filtered DC signal into an AC signal. In particular implementations, the AC signal is an alternating current rectangular wave. The rectangular wave may be continuous of have discontinuous, in which case it may appear as a series of alternating current pulses. The AC signal may have a relatively high frequency compared to the input AC power signal, which typically has a frequency around 100-150 Hz. In particular implementations, the AC signal generated by DC-AC convertor 134 may have a nominal frequency around 50 kHz, although the frequency could vary during operation (e.g., from 0 Hz to 75 kHz).

In particular implementations, DC-AC convertor 134 may include a number of field effect transistors. The field effect transistors may be switched on and off to convert the filtered DC signal into a rectangular wave signal. In certain implementations, the field effect transistors may be metal-oxide-semiconductor field-effect transistors (MOSFETs).

Figure 2A:
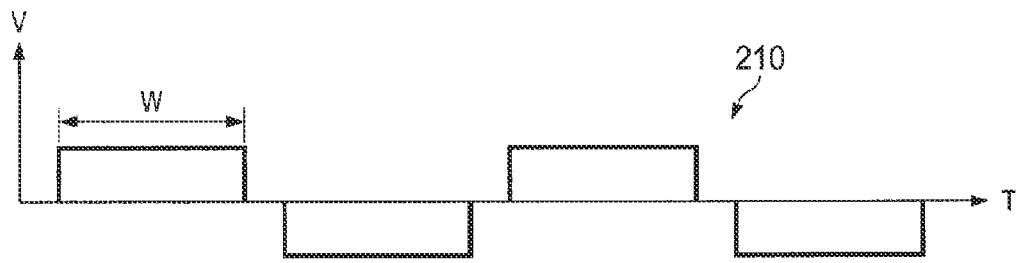
FIGS. 2A-B are signal diagrams illustrating example alternating signals for a system for generating a DC power signal for an electro-chemical reactor.
Figure 2B:
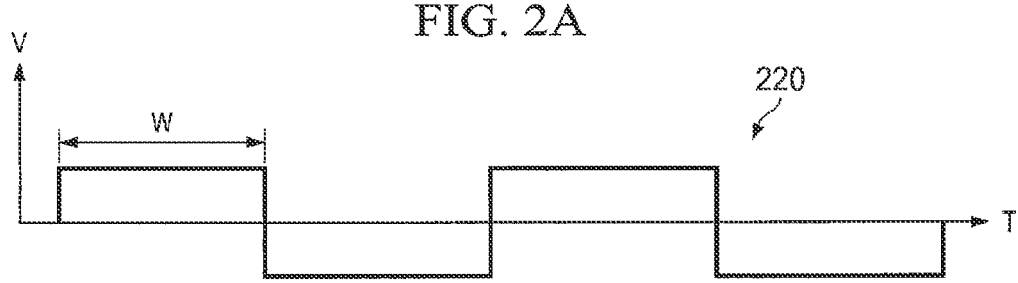

FIGS. 2A-B illustrate two different forms of rectangular wave that may be produced by DC-AC convertor 134. In FIG. 2A, signal 210 is a series of alternating current rectangular pulses with gaps in between. In FIG. 2B, signal 220 is a continuous rectangular wave.

The rectangular wave from DC-AC convertor 134 is received by a voltage adjuster 136, which is also part of a power conversion module 130. Voltage adjuster 136 down converts the voltage of the AC signal. In certain implementations, the output voltage from the power conversion modules 130 is approximately 48 V, and the input voltage is approximately 480 V. Thus, the voltage adjuster may adjust the voltage by a ratio of 1:11. In particular implementations, voltage adjuster 136 may include a transformer, which may or may not have a core.

Each power conversion module 130 also includes an AC-DC convertor 138 and a filter 140. AC-DC convertor 138 is responsible for converting the voltage adjusted AC signal from voltage adjuster 136 into a DC power signal. In certain implementations, AC-DC convertor 138 may, for example, be composed, at least in part, of diodes. For example, Schottkey diodes in a bridge configuration (e.g., an H-bridge) may be used. Filter 150 is coupled to AC-DC convertor 138 and is responsible for smoothing the DC power signal therefrom. The DC power signal is then ready to be applied to an electro-chemical reactor.

Each power conversion module 130 also includes a controller 142 and a signal sensor 144. Controller 142 is responsible for controlling DC-AC convertor 134 to generate the appropriate DC power signal. In implementations in which DC-AC convertor 134 includes field effect transistors, controller 142 may control the field effect transistors so that they switch on and off to produce a rectangular wave. Controller 142 may control DC-AC convertor 134 to generate any appropriate AC signal, which may be determined by the controller or dictated by an external device (e.g., a user input or another controller).

In particular implementations, controller 142 may, for example, include a microcontroller. In other implementations, controller 142 may include a microprocessor, a field programmable gate array, an application specific integrated circuit or any other device that can manipulate information in a logical manner. Controller 142 may also include one or more forms of memory, such as, for example, random access memory (RAM), read only memory (ROM), and/or programmable read only memory (PROM). In general, any suitable form of information storage device may be used. Memory may hold instructions and/or data for the processor of the controller.

Signal sensor 144 is responsible for sensing the current of the output DC power signal and providing an indication of this to controller 142. Controller 142 may then adjust the AC signal based on the output. Signal sensor 144 may, for example, be a resistor or any other appropriate device for sensing current.

In certain implementations, system 100 may also sense the voltage of the output DC power signal and prevent it from increasing too high. For example, if the resistance of the fluid in the electro-chemical reactor increases, the voltage will have to increase to deliver the same current. The voltage of the output DC power signal may, for example, be sensed by a voltage divider (e.g., a pair of resistances in series) or any other appropriate device of sensing voltage.

Output signals from power conversion modules 130 are combined together on a bus 194. Bus 194 couples the power conversion modules 130 together in a parallel relationship. Thus, the current from the power conversion modules is added together on bus 194.

Power conversion modules 130 are physically located relative to each other by a mounting structure 190. Mounting structure 190 may, for example, be a shelf or a rack. In particular implementations, mounting structure 190 includes a shelf on which a number (e.g., 2 or more) of the power conversion modules may be mounted. Moreover, certain implementations may include a rack that is able to receive a number of shelves. For example, a mounting structure may include a rack that holds four shelves with each shelf adapted to hold four power conversion modules, for a total of sixteen power conversion modules. Each shelf may have a socket in the rack.

System 100 also includes a polarity reverser 150 and an electrical output connector 160. Polarity reverser 150 is coupled to bus 194 and receives the combined output DC power signal from power conversion modules 130. Polarity reverser 150 is responsible for reversing the polarity of the DC output signal at various points. Reversing the polarity of the output DC power signal may be advantageous for certain electro-chemical reactors. In particular implementations, the polarity reverser is a double pole, double throw (DPDT) device.

In operation, polarity reverser 150 is typically controlled by an external controller. The main controller for system 100, to be discussed below, may, for example, control polarity reverser 150. The controller may reverse the polarity at a specified time or upon direction by selectively supplying power to the coils.

Electrical output connector 160 is coupled to polarity reverser 150 and provides a point at which to couple electrical conductors to system 100. Electrical output connector 160 may be a special purpose or industry standard electrical connector and usually includes a pair of connectors (one for the positive and one for the negative). In particular implementations, electrical output connector is a 160 Cam-Lok "F" series connector, which has a single-pin, twisting locking, connector plug.

System 100 also includes a power converter 170 and a controller 180. Power convertor 170 is responsible for converting power from the incoming AC power signal into a format acceptable by controller 180 (e.g., 24 V DC). Power convertor 170 may, for example, be a switching power supply. In particular implementations, controller 180 may, for example, include a microcontroller. In other implementations, controller 180 may include a microprocessor, a field programmable gate array, an application specific integrated circuit, or any other device that can manipulate information in a logical manner. Controller 180 may also include one or more forms of memory, such as, for example, random access memory (RAM), read only memory (ROM), and/or programmable read only memory (PROM). In general, any suitable form of information storage device may be used. Memory may hold instructions and/or data for the processor of the controller.

Controller 180 is responsible for managing system 100. As part of this, controller 180 may be responsible for controlling the amount of power being output by each power conversion module 130. To accomplish this, controller 180 may determine how much power is to be output by system 100. Controller 180 may, for example, determine this based on input from one or more user input devices or from a remote terminal. Once controller 180 determines how much power is to be output by system 100, controller 180 may assign portion of the power to each power conversion module 130. For example, controller 180 may evenly divide the output power between each power conversion module 130. In certain implementations, controller 180 may also control polarity reverser 150.

In certain implementations, at least some of the instructions for controller 180 may be programmed using ladder logic. For example, the programming may not be required for basic operation of system 100, including timed polarity alternation or even basic remote control. However, the ladder logic may convert the controller into a programmable logic controller (PLC) with the system's current and voltage setpoints and the polarity being controlled by the ladder diagram. Moreover, the ladder logic may be used to control advanced operation of system 100 and to control and respond to remote input/output terminals, allowing system 100 to be integrated with additional sensors, actuators, and subordinate controllers. Control from a remote terminal may, for example, be provided by a 4-20 mA signal. In certain implementations, the ladder logic may control system 100 itself and a number of (e.g., 25) digital outputs, a number of (e.g., 10) digital inputs, and an analog input. Thus, the system may control auxiliary process operations or even an entire system.

Even with no remote terminal connected, system 100 may exercise some external control. An external interface may, for example, have a run input, a polarity input, and a 4-20 mA input. These may become general-purpose I/O when a ladder diagram is loaded.

System 100 may have different operating modes. In some modes, for example, it may operate according to user inputs (e.g., output current, output voltage, and polarity reversal). In other modes, it may operate according to programs (e.g., from local ladder logic or a remote logic controller). When operating from local ladder logic, the system may ignore user settings (e.g., voltage, cycle time, polarity alternation, etc.), or it may respond to user settings.

In certain modes of operation, for example, system 100 may check to see if a ladder diagram is loaded. if one is not loaded, system 100 may look for a remote terminal on an expansion network. The expansion network may, for example, be a wireline network. Example expansion components may, for example, include Category 5 or Category 6 cables and 8138C modular plugs (e.g., RJ45, RJ61, etc.). The network may, for example, be a linear daisy chain, with the module at the distal end of the network being terminated.

Expansion modules may include a remote control panel, a discrete I/O remote terminal unit (RTU), an external control RTU, a data logger, and a Web interface. A remote control panel may be a duplicate of the system's control panel (not shown), which can be mounted remotely. A discrete I/O RTU may provide digital outputs (e.g., 12) and digital inputs (e.g., 4) to control auxiliary devices like valves and contactors or to interface the system's control system to external control systems. An external control RTU may provide digital inputs, digital outputs, and a 4-20 mA analog input to control the system's set point. A data logger may record timer-stamped current and voltage readings (e.g., onto a USB thumb drive). A Web interface may allow monitoring and control of the system over the Internet.

If a remote terminal is present, system 100 may respond to inputs from the remote terminal. The system's expansion network may support multiple remote terminals.

Table 1 lists example functions of each remote terminal input and output. Some of these inputs/outputs will be explained later.

TABLE 1

| | |
|---|---|
| IN 1 | Energize to activate the system in automatic mode. |
| IN 2 | Energize to reverse the output, if the built-in timers are disabled. |
| IN 3 | Energize to activate the boost current setpoint. |
| IN 4 | Not used in this mode. |
| OUT 1 | Energized when AC power is supplied. |
| OUT 2 | Energized when the system output is on (even if the setpoint is 0). |
| OUT 3 | Energized to indicate voltage limit operation. |
| OUT 4 | Energized when the boost current feature is active. |
| OUT 5 | Energized when the output polarity feature is forward. |
| OUT 6 | Energized when the output polarity feature is reversed. |
| OUT 7 | Energized when there is a fault present. |
| OUT 8 | Energized when a warning condition exists. |
| OUT 9 | Energized when the system is switched into automatic mode is ON. |
| OUT 10 | Energized when the system is switched into automatic mode. |
| OUT 11 | Energized during the pre-reverse or post-reverse periods. |
| OUT 12 | Energized when the system is running but not in pre- or post-reverse. |

An automatic polarity timer, including a boost current feature, may still operate unless explicitly disabled in the configuration settings. The current setpoint may come from a 4-20 mA input, either internal or on the remote terminal, or from the control panel. The remote terminal may be able to activate the boost current setpoint even if the polarity timers are disabled.

If no ladder logic is loaded and no remote terminal is connected to the expansion network, system 100 will respond to controller 180. Controller 180 may have a 4-20 mA input to control the current setpoint and two discrete inputs (e.g., 24 V) to enable and control the output polarity. These inputs can operate in different modes, depending on a configuration parameter.

If the parameter indicates that the controller cannot control polarity, the controller cannot control the polarity and the two inputs may function as if connected to a normally-open Start switch and a normally-closed Stop switch. A stop/polarity input may have to be energized for the system to run. A start/enable input performs the start function. Energizing this input momentarily will start the system running, provided the stop input is also energized. To stop the system output, the stop input may be de-energized.

If the parameter indicates that the controller call control polarity, the stop/polarity input can be used to control the output polarity. In this mode, the start/enable input should be energized continuously for the system to run and de-energized to shut it off. The stop/polarity input can be energized to command the system to reverse the output polarity.

Even with the controller polarity enabled, the automatic polarity timers may still operate unless explicitly disabled by setting both the forward and reverse times to zero. These parameters may have to be set to zero if the controller is to control the polarity.

Controller 180 may give a number of outputs. In one implementation, outputs may indicate that the system is running, that it is within its voltage limit, and that it is within the pre-reverse and post-reverse interval. The controller may not be able to activate the boost current setpoint.

As part of its operations, controller 180 may determine the number of power conversion modules 130 in system 100. For example, controller 180 may request that the power conversion modules 130 report their addresses to it. As another example, controller 180 may assign addresses to the power conversion modules 130 and determine how many power conversion modules there are from this process.

In particular implementations, for instance, power conversion modules 130 may be coupled together in a series (e.g., in daisy-chain fashion) to controller 180. Controller 180 may communicate with power conversion modules using a bit synchronous protocol, RS-485, or any other appropriate communication protocol.

Controller 180 may then instruct the power conversion modules 130 to turn off their output ports. Then, controller 180 may send out a first address over the coupling. The power conversion module 130 that receives the address may then use that address. Controller 180 may then instruct the power conversion module 130 that has an address to turn on its output port. Controller 180 may then send a second address. The power conversion module 130 that receives the second address and has its output turned off may then use the second address. Controller 180 may continue this process until each power conversion module 130 has an address. Thus, controller 180 may be able to individually communication with the power conversion modules 130. During this process, the controller 180 may also determine how many of the power conversion modules 130 are available.

Once controller 180 has individual addresses for each power conversion module 130, the controller may individually communicate with them (e.g., to set an output current level). In some implementations, controller 180 may also communicate to all power conversion modules on a channel by using a channel address. Thus, the controller can communicate a piece of information (e.g., an output current level) to the power conversion modules on a channel at once. Controller 180 may also have a broadcast address to communicate with all power conversion modules 130 at the same time.

Controller 180 may also be responsible for providing output to a user regarding the operation of system 100. For example, controllers 142 may report metrics (e.g., current and voltage) regarding their associated output DC power signals to controller 180. Controller 180 may then add the currents and average the voltages to determine the total output power signal being generated by the system. Additionally, controller 180 may control auxiliary devices for system 100 (e.g., fans).

In certain implementations, controller 180 may command that a momentary boost in power occur at each polarity reversal.

At 48 Volts output, system 100 is rated as functional extra-low voltage (FELV) and standards declare such voltages to be safe. However, there have been reports of rare instances of electrocution at voltages as low as 25 Volts. Thus, contact with electrical output connector 160 should be avoided. Moreover, system 100 is designed to deliver very high power levels to output connector 160. If this power is dissipated, whether intentionally or accidentally, in an inappropriate load, conductors may melt or even explode. Breaking a circuit carrying such current can also cause a dangerous arc flash.

The output wiring of the system should be laid out with care. The two leads for each channel should be routed together in the same duct or conduit. If the leads are separated, forming a loop, the circuit becomes inductive, and an inductive circuit can provide high voltage transients when current changes rapidly.

System 100 has a variety of features. For example, because power conversion modules 130 may be added and subtracted as needed, system 100 may be readily scaled to the electrochemical reactor. Thus, as opposed to having to have different sized rectifiers for different applications, system 100 provides the ability to have one system address a number of operations (e.g., 0 to 800 Amps, 0 to 1,600 Amps, and 0 to 4,800 Amps). The scalability of system 100 also provides for increased power efficiency as compared to prior devices because system 100 does not dissipate power that it does not use—it simply does not draw it. At lower powers (e.g., 20%), prior devices may be around 10% efficient, while system 100 may still be around 80% efficient. Also, by converting a relatively high-frequency signal (e.g., a 1000 times higher), fewer losses occur due to higher frequency harmonics. Prior systems typically use phase angle control when rectifying a signal, and this leads to the generation of a relatively large amount of heat to due high frequency harmonics. Thus, even at full power, system 100 may achieve efficiencies in the range of 95%, while existing devices may be in the range of 85%. Moreover, if a power conversion module 130 fails, it may be readily replaced (e.g., in less than 10 minutes).

System 100 is also able to provide tighter control of the output DC power signal. In existing systems, control adjustments can be made about every 16 milliseconds (i.e., 1/60 Hz). But when system 100 is operating at 50 kHz, for example, adjustments may be made at every 20 microseconds (i.e., 1/50 kHz). The higher frequency also allows transformer 146 to be made smaller relative to prior systems, which helps to reduce size and weight. System 100 is also able to operate with a wider variety of inputs. Prior systems designed to operation at a particular input (e.g., 60 Hz) are not typically able to accommodate other power inputs (e.g., 50 Hz). System 100 is more adaptable, however, because it generates its own AC signal (e.g., at 50 kHz) that is converted to the output DC power signal.

System 100 is further able to provide continuous operation at most any combination of current and voltage within its capacity. Even when the system is configured for a large output power (e.g., 5,000 Amps), it should not be damaged by operating at low currents or into a dead short circuit.

In certain implementations, a system like system 100 may be able to group the power conversion modules into a number of sets, thereby establishing a number of output channels. For example, if a mounting structure has a number of shelves, the power conversion modules on each shelf may be formed into a group. The channels may, for example, be grouped and controlled by using ladder logic. The output power (e.g., voltage and/or current) for each channel may then be individually determined, and a portion of the output power signal may be assigned to each power conversion module in the associated group. Polarity reversal, if used, may be assigned to the channels as a whole. That is, all channels may reverse together.

For example, assume that a system had three shelves with four power conversion modules per shelf. The first shelf could be assigned to a first channel, the second shelf could be assigned to a second channel, and the third shelf could be assigned to the third channel. The output power signal for the first channel could be determined by the main controller and then divided between the power conversion modules on the first shelf. Then, the output power signal for the second channel could be determined by the main controller and divided between the power conversion modules on the second shelf. Then, the output power signal for the third channel could be determined by the main controller and divided between the power conversion modules on the third shelf.

In particular implementations, the output from more than one shelf may be conveyed to one electro-chemical reactor. In this instance, the controller may know if more than one shelf is associated with a channel and assign a portion of the output power signal to each power conversion module in the channel. The power from each shelf may be output on an output connector for the shelf. The cables from the output connector pair to the load may then be paralleled (e.g., on the load end).

In some implementations, a number of systems like system 100 may be grouped together (e.g., in a master-slave relationship). This may, for example, make it possible to configure the complete system to deliver up to 20,000 Amps with variable power from zero to full power with a single knob.

Although system 100 has been primarily discussed with respect to 420 V, 3 phase input power, other systems similar to system 100 may use other standard input powers. For example, a system in accordance with the present invention could operate at 600 V, 3 phase power or 208 V, 3 phase power. Additionally, a system in accordance with the present invention could use 240 V, 1 phase power or 120 V, 1 phase power. When adjusting for different phases and voltages, certain modifications may have to be made. For example, AC-DC convertor 120 may have to be modified (e.g., to a 4 diode bridge) for 1 phase power. As another example, the winding ratio for voltage adjuster 136 may have to be adjusted for different voltage ratios (e.g., from 11:1 to 6:1 when adjusting from 420 V to 240 V).

Although system 100 has been primarily discussed with respect to a 48 V output signal, other output voltages could be used in other implementations. For example, a higher voltage may be needed for electro-chlorination, electro-dialysis, chloralkali, and electro-plating. Other voltages (e.g., 60 V or 120 V) may be required for other electrochemistry operations. The adjustment in voltage could be made by changing the winding ratio. Additionally, for some implementations, the diodes may be adjusted. Typically, one wants the lowest voltage regulated diode for the highest efficiency that will not fail.

System 100 may have a variety of other configurations in other implementations. For example, polarity reverser 150 and/or electrical output connector 160 may be included on mounting structure 190. As another example, a number of mounting structures may be used (e.g., a number of shelves each containing a number of power conversion modules).

In certain implementations, system 100 may also include a number of user output devices and user input devices. User output devices may include gauges, displays, read outs, or any other type of device by which information may be communicated to a user. For example, the system 100 may have a user output device (e.g., a gauge or read out) that indicates how much voltage the system is outputting and a user output device (e.g., a gauge or read out) that indicates how much current the system is outputting. Additionally, system 100 may have a display that indicates what mode the system 100 is in and various input parameters (e.g., specified output voltage, specified output current, operating time, number of channels, which shelves are part of each channel, etc.). User input devices may include dials, keypads, touch screens, switches, or any other types of devices by which a user may input information to system 100. For example, the system may have dials by which a user may set a specified output voltage and a specified output current. Additionally, the system may have a keypad by which a user may indicate which shelves are associated with which channels.

To provide for safety, in certain implementations, system 100 may produce a number of warnings and/or shut down. A fault severe enough for the system to shut down may cause a fault annunciator (e.g., a red light) to illuminate and a message to be displayed on a display screen. The system may not restart, even if the fault condition is resolved, until a switch has been moved to the off position and the back to an operational position (e.g., on or automatic).

A condition which warrants a warning may cause a fault annunciator to flash and a message may be displayed on a display screen. System 100 may continue to operate, but the fault condition should be resolved to prevent damage or escalation of the fault condition.

The fault annunciator may also flash for a period (e.g., 15-30 s) when system 100 is stopped. This may allow the high voltage components (e.g., busses) to discharge. The power conversion modules operate at high DC voltage, which can be lethal. In a 480 V system, for example, the DC bus may reach 720 V. Moreover, modules contain high voltage capacitors that store significant energy. Allowing them to discharge (e.g., through bleeder resistors) will facilitate safe use.

Table 2 lists a number of example messages that may be displayed and the conditions that cause them.

TABLE 2

| | |
|---|---|
| CONFIG ERROR Channel Sizes (Fault) | If a unit is configured for multi-channel operation, the sum of the modules assigned to each channel should equal the number of modules installed. If the configuration is correct, check the connections between the modules and that all modules display an acceptable annunciator (e.g., green). |
| NO MODULES (Fault) | The control system did not detect an installed converter module. Check the connections between the modules. |
| HOT MODULE (Fault) | One of more converter modules are overheated. This may be caused by high ambient temperature, a problem with the fans, a dirty air filter, or a defective or damaged converter module. The display may show the module number. The annunciator on the module(s) may also indicate a problem (e.g., be red). |

TABLE 2-continued

| | |
|---|---|
| MODULE FAULT (Fault) | One or more converter modules is reporting an unspecified error. The display may show the module number. The annunciator on the module(s) may also indicate a problem (eg., be red). |
| MODULE COMMS (Warning or Fault) | The control system is experiencing errors in the converter module communication network. Check for loose connections or defective jumpers. In a multi- cabinet system, the connection between cabinets could be a problem. |
| INTERLOCK (Fault) | The interlock circuit is open. This occurs if the front door or the filter access is open, or if an external interlock, such as an emergency stop, has been connected to the system and that circuit is open. If all switches and wiring are intact, replace the control panel. |
| FAN FAILURE (Warning) | The fan control does not detect rotation of one or more fans. This is not a fatal fault, but fan problems can lead to an overheating problem, which will cause the system to shut down. If all fans are turning, this may indicate a wiring problem or fault with the fan controller itself. |
| FAN COMMS (Warning) | The main controller cannot communicate with the fan controller. If all fans are stopped, suspect wiring or the power supply. If the fans are turning, suspect wiring, the fan controller, or the main control PCB. If the fan controller uses an expansion bus, disconnect expansion modules and install a terminator plug to verify that the fault is not in the expansion wiring. |

In some implementations, system 100 may include a precharge assembly for AC-DC convertor 120. The pre-charge assembly may be activated before the full operation of AC-DC convertor 120 to allow capacitors to charge before beginning full operation. The pre-charge assembly may, for example, include a set of resistors in series that limit the inrush current as the capacitors initially charge. Once the capacitors are charged, a relay may shunt the resistors so that they do not continue to dissipate power.

Figure 3:
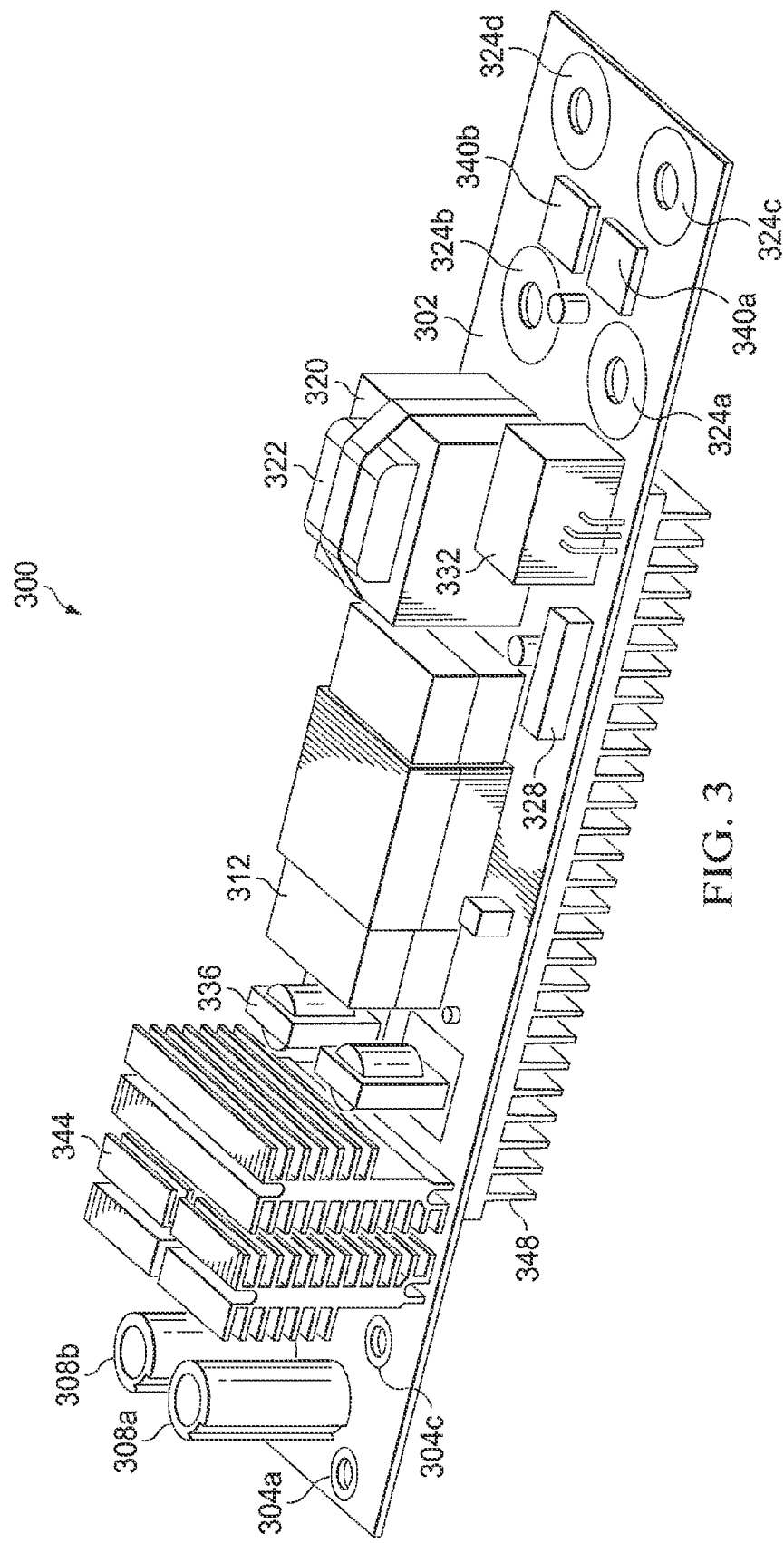
FIG. 3 is a line drawing illustrating an example power conversion module for a system for generating a DC power signal for an electro-chemical reactor.

FIG. 3 illustrates an example power conversion module 300. Power conversion module 300 may, for example, be useful in a system similar to system 100.

Focusing first on the electronic components in the signal flow path, power conversion module 300 includes a substrate 302 on which the electronic components of the power conversion module are mounted. Substrate 302 may, for example, be composed of fiberglass (e.g., FR-4) or any other appropriate material.

Set into substrate 302 are four input signal terminals 304 (only two of which are visible). Input signal terminals 304 are responsible for receiving an input DC signal for the power conversion module 300. One pair of input signal terminals is responsible for receiving the positive signal, and one pair of input signal terminals is responsible for receiving the negative signal.

Coupled to input signal terminals 304 are capacitors 308. Capacitors 308 are responsible for filtering the input DC signal.

On the bottom side of substrate 302 are field effect transistors (not visible) that act as switches for the incoming DC signal. In this implementation, the transistors may be metal-oxide-semiconductor field effect transistors arranged in a bridge configuration (e.g., an H bridge). In certain modes, the field effect transistors may be operated at a nominal frequency of approximately 50 kHz.

The field effect transistors are coupled to and provide the alternating rectangular pulses to a transformer 312. Transformer 312 down converts the voltage of the alternating rectangular pulses. For example, if the input voltage is 420 V and the desired output voltage is 48 V, the winding ratio may be 1:11. In this implementation, transformer 312 is a planar transformer.

Transformer 312 is coupled to and provides the voltage-adjusted alternating rectangular pulses to a rectifier located on the bottom of substrate 302. The rectifier may, for example, be composed of two or more diodes. In particular implementations, the rectifier may be a pair of Schottkey diodes in a bridge configuration. The rectifier converts the alternating rectangular pulses to a direct current signal, which may be pulsed or continuous.

The rectifier is coupled to and provides the direct current signal to a filter 320. Filter 320 is responsible for smoothing the direct current signal to generate a fairly continuous direct current signal. Filter 320 includes a coil 322, which may have a high dynamic impedance. Coil 322 may designed for the nominal operating frequencies of the field effect transistors.

Set into substrate 302 are four output signal terminals 324. Output signal terminals 324 are responsible for receiving the output DC power signal from the filter 320 and conveying it to a bus. One pair of the output signal terminals 324 is responsible for conveying the positive signal, and one pair of the output signal terminals 324 is responsible for receiving the negative signal.

Power conversion module 300 also includes various electronic components for controlling the operation of the power conversion module. For example, power conversion module 300 includes a controller 328 and a current sensor 332. Controller 328, which may, for example, be a microcontroller. Current sensor 332 is responsible for sensing the amount of current in the output DC power signal and providing an indication of this to controller 328. Controller 328 may use this indication to alter the operation of the field effect transistors (e.g., to lengthen or shorten the pulses being produced thereby).

Coupled between controller 328 and the field effect transistors is a transformer 336. Transformer 336 provides galvanic isolation between controller 328 and the field effect transistors. Galvanic isolation is beneficial if controller 328 and the field effect transistors are operating at different voltages (e.g., 24 V versus 20 V).

Power conversion module 300 also includes a coupler 340a that provides communication and power to controller 328 and a coupler 340b that provides communication and power to another power conversion module.

Power conversion module 300 additionally includes a heat sink 344 and a heat sink 348. Heat sink 344 is coupled to the field effect transistors to dissipate the heat generated while being switched. Heat sink 348 is coupled to the diodes in the rectifier.

As illustrated, power conversion module 300 is designed to deliver up to 100 Amps at 48 Volts. Additionally, similar power conversion modules can be added to expand the delivery capacity (e.g., to 200 Amps, 300 Amps, 400 Amps, etc.). These power conversion modules may be placed in the same mounting structure (e.g., shelf and/or rack) as power conversion module 300 and coupled to power conversion module using coupler 340b (e.g., in daisy chain fashion). Power conversion modules for different powers (e.g., 200 Amps at 48 Volts or 500 Amps at 48 Volts) could be similarly constructed, although some components will have to be larger and those that are not available in larger sizes may have to be combined in parallel, as one of skill in the art would understand. These high power modules may be placed in the same mounting structure as the 100 Amp modules. Thus, modules having different powers may operate in parallel with each other.

Figure 4:
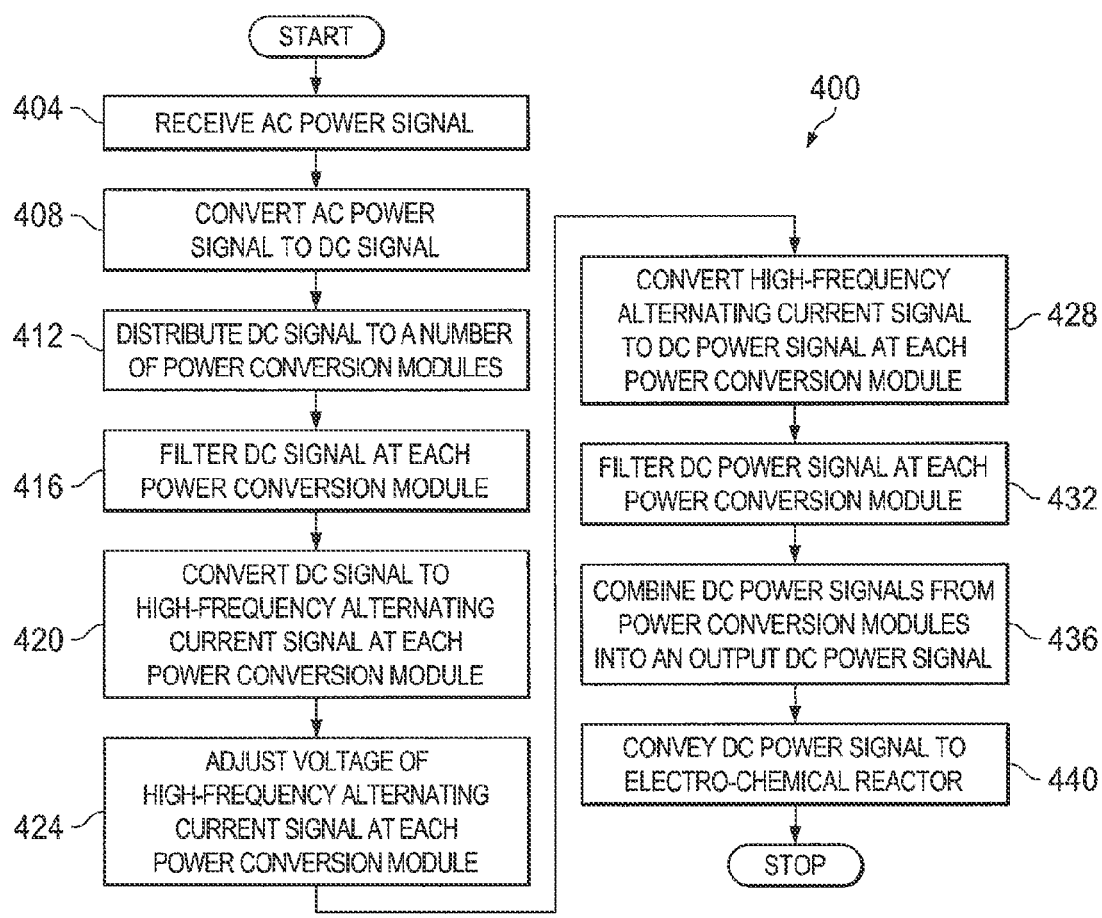
FIG. 4 is a flowchart illustrating selected operations of an example process for generating a DC power signal for an electro-chemical reactor.

FIG. 4 illustrates an example process 400 for generating a DC power signal for an electro-chemical reactor. Process 400 may, for example, be performed by a system similar to system 100.

Process 400 calls for receiving an AC power signal (operation 404) and converting it into a DC signal (operation 408). The AC power signal may, for instance, be a standard electrical signal (e.g., 120 V, 3 phase; 240 V, 3 phase; or 420 V, 3 phase) and be received through a standard connector. The AC power signal may, for instance, be converted to a DC signal by a rectifier (e.g., a bridge of diodes).

Process 400 also calls for distributing the DC signal to a number of power conversion modules (operation 412). The DC signal may, for instance, be distributed by supplying DC signal to a bus that runs to the power conversion modules. Each power conversion module may be responsible for converting a portion of the DC signal to a portion of a DC power signal for an electro-chemical reactor.

At each power conversion module, process 400 calls for filtering the DC signal (operation 416). The filtering may, for example, be performed with a capacitor. Process 400 also calls for converting the DC signal to high-frequency alternating current signal (operation 420). The conversion may, for instance, be performed by supplying the filtered DC signal to a set of field effect transistors and switching the transistors on and off, which may produce a series of alternating rectangular pulses. Process 400 additionally calls for adjusting the voltage of the high-frequency alternating current signal (operation 424). Adjusting the voltage may, for instance, be performed with a transformer. In particular implementations, the voltage may be down converted (e.g., from several hundred Volts to a few tens of Volts). Process 400 also calls for converting the high-frequency alternating current signal to a DC power signal at each power conversion module (operation 428). The high-frequency alternating current signal may, for instance, be converted to a DC power signal by routing the pulses to a rectifier (e.g., a bridge of diodes). Process 400 additionally calls for filtering the DC power signals at each power conversion module (operation 432). Because the pulses may have gaps between them even after being converted, filtering the DC power signal may provide a smooth signal. The filtering may, for instance, be performed by an inductive-capacitive filter.

Continuing on from the power conversion modules, process 400 calls for combining the DC power signal from the power conversion modules into an output DC power signal (operation 436). The DC power signals may, for instance, be combined by supplying the DC power signals to a bus that runs to each power conversion module. Process 400 also calls for conveying the DC power signal to an electro-chemical reactor (operation 440). Conveying the DC power signal to an electro-chemical reactor may, for instance, be accomplished by conveying the signal through a pair of connectors, which may be coupled to wires that convey the DC power signal to the electrochemical reactor.

Although FIG. 4 discloses a process for generating a DC power signal for an electro-chemical reactor, other processes for generating a DC power signal for an electro-chemical reactor may include fewer, additional, and/or a different arrangement of operations. For example, a process may not include distributing the DC signal to a number of power conversion modules. Thus, a system may have just one power conversion module. This power conversion module may, however, be able to be readily switched for another power conversion module if a different power is required. Moreover, another power conversion module may readily be added. As another example, a process may not include filtering the DC signal at each power conversion module. Instead, for example, the DC signal may be filtered when it is converted. As another example, a process may call for reversing the polarity of the combined DC power signal. As an additional example, a process may call for managing the power conversion modules. Furthermore, one or more operations may be performed in a contemporaneous or simultaneous manner.

Figure 5:
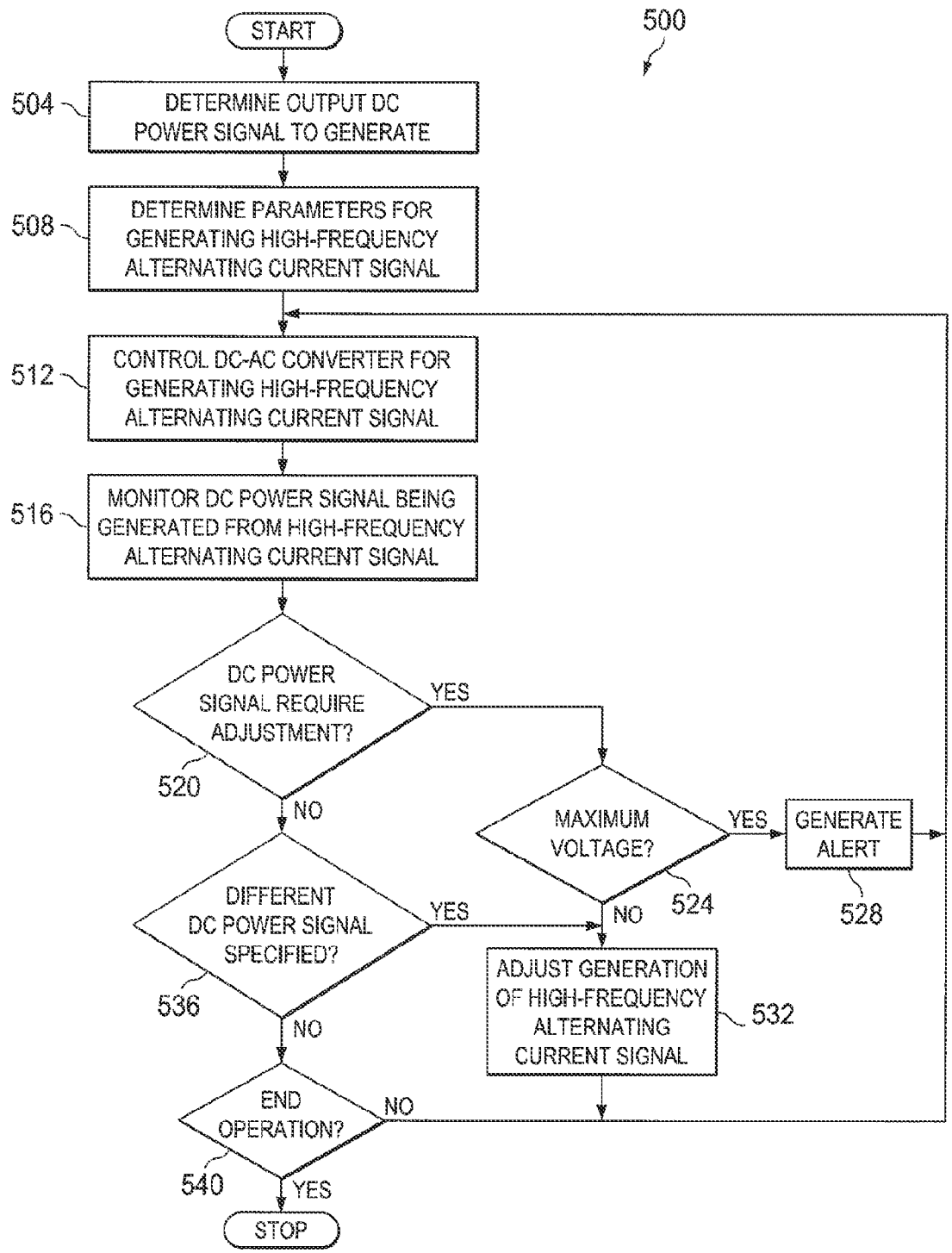
FIG. 5 is a flowchart illustrating selected operations of another example process for generating a DC power signal for an electro-chemical reactor.

FIG. 5 illustrates another example process 500 for generating a DC power signal for an electro-chemical reactor. Process 500 may, for example, be implemented by a system similar to system 100 and may be used with various processes such as process 400. In particular, process may be implemented by a controller similar to controller 142. Process 500 may, for example, begin when power is supplied to a power conversion system.

Process 500 calls for determining an output DC power signal to generate (operation 504) and determining parameters for generating a high-frequency alternating current signal (operation 508). The generated DC power signal may, for example, vary based on voltage and/or current. Determining an output DC power signal to generate may, for instance, be accomplished by examining user input or programmed instructions. The parameters may, for example, include the width of the pulses and the frequency. Determining the parameters may, for example, depend on specified output DC power signal (e.g., voltage and/or current) and the expected resistance in the electro-chemical reactor.

Process 500 also calls for controlling a DC-AC converter for generating the high-frequency alternating current signal (operation 512). The DC-AC converter may, for example, include switchers (e.g., field effect transistors), and the high-frequency alternating current signal may be composed of alternating rectangular pulses.

Process 500 additionally calls for monitoring a DC power signal being generated from the high-frequency alternating current signal (operation 516). The DC power signal may be monitored for voltage and/or current. Process 500 also calls for determining whether the DC power signal requires adjustment (operation 520). The DC power signal may, for example, require adjustment if it is not meeting the metrics determined in operation 504.

If the DC power signal does require adjustment, process 500 calls for determining whether the maximum voltage has been reached for the DC power signal (operation 524). If the maximum voltage has been reached, process 500 calls for generating an alert (operation 528) and continuing to control the DC-AC converter (operation 512). If, however, the maximum voltage has not been reached, process 500 calls for adjusting the generation of the high-frequency alternating current signal (operation 532). For example, if the current is too high, the width of the signal may be narrowed, or if the current is too low, the width of the signal may be widened. Process 500 then continues with continuing to generate the high-frequency alternating current signal (operation 512).

If the DC power signal does not require adjustment, process 500 calls for determining whether a different DC power signal has been specified (operation 536). A different DC power signal may, for example, have been specified by a user. If a different DC power signal has been specified, process 500 calls for adjusting the generation of the high-frequency alternating signal (operation 532) and continuing to generate the high-frequency alternating current signal (operation 512).

If, however, a different DC power signal has not been specified, process 500 calls for determining whether operation should end (operation 540). Determining that operation should end may, for example, be based on time or user input (e.g., stop command). If operation should not end, process 500 calls for continuing to generate the high-frequency alternating current signal (operation 512). If, however, operation should end, process 500 is at an end.

Although FIG. 5 discloses a process for generating a DC power signal for an electro-chemical reactor, other processes for generating a DC power signal for an electro-chemical reactor may include fewer, additional, and/or a different arrangement of operations. For example, a process may include determining whether overheating is occurring and generating an alert if overheating is occurring. As another example, a process may not include determining whether a maximum voltage has been reached. Furthermore, one or more operations may be performed in a contemporaneous or simultaneous manner.

Figure 6:
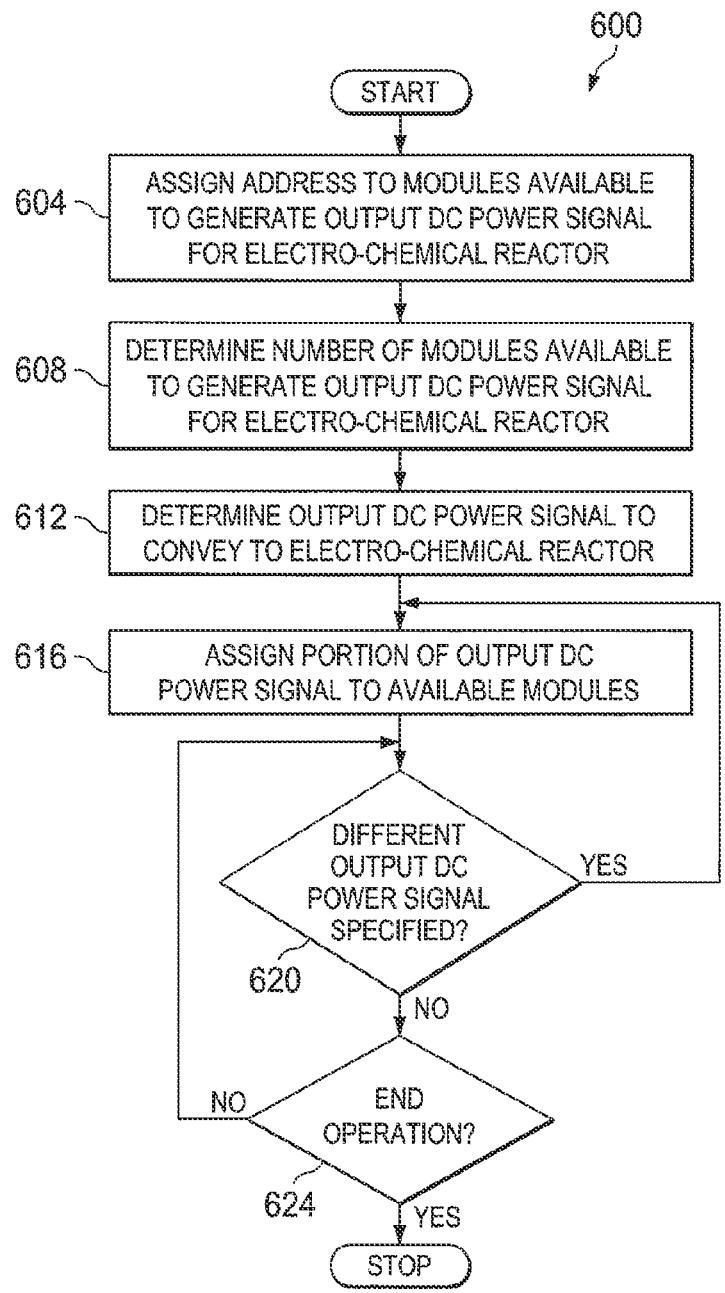
FIG. 6 is a flowchart illustrating selected operations of an additional example process for generating a DC power signal for an electro-chemical reactor.

FIG. 6 illustrates an additional example process 600 for generating a DC power signal for an electro-chemical reactor. Process 600 may, for example, be implemented by a system similar to system 100 and may be used with various processes such as process 500. In particular, process 600 may be implemented by a controller similar to controller 180. Process 600 may, for example, begin when power is supplied to a power conversion system.

Process 600 calls for assigning addresses to power conversion modules available to generate an output DC power signal from an electro-chemical reactor (operation 604). Assigning addresses to power conversion modules may, for example, be performed by sequentially assigning the addresses to the power conversion modules. As part of this, the power conversion modules may have to be discovered (e.g., through a ping/response protocol).

Process 600 also calls for determining a number of power conversion modules available to generate an output DC power signal for an electro-chemical reactor (operation 608). The number of modules may, for example, be determined by the number of modules to which addresses have been assigned.

Process 600 additionally calls for determining the output power signal to convey to the electro-chemical reactor (operation 612). The output power signal to convey to the electro-chemical reactor may, for example, be determined by receiving user input or instructions from a remote controller.

Process 600 also calls for assigning a portion of the output DC power signal to the available power conversion modules (operation 616). The output DC power signal may, for example, be apportioned evenly between the available power conversion modules.

Process 600 also calls for determining whether a different output DC power signal has been specified (operation 620). The output DC power signal to convey to the electro-chemical reactor may, for example, be adjusted by user input or instructions from a remote controller. If a different output DC power signal has been specified, process 600 calls for assigning a portion of the updated output DC power signal to the available power conversion modules (operation 616).

If a different output DC power signal has not been specified, process 600 calls for determining whether to end operation (operation 624). If operation should end, process 600 is at an end. If, however, operation should not end, process 600 calls for again for again determining whether a different output DC power signal has been specified (operation 620).

Although FIG. 6 discloses a process for generating a DC power signal for an electro-chemical reactor, other processes for generating a DC power signal for an electro-chemical reactor may include fewer, additional, and/or a different arrangement of operations. For example, a process may not include assigning addresses to the available power conversion modules. The addresses could, for example, be set by a user on installation (e.g., through the use of jumpers). As another example, a process may not include determining the number of available power conversion modules. The number of available power conversion modules could, for example, be set by a user at the beginning of operation. As another example, a process may include assigning portions of a first output DC power signal to a first group of available power conversion modules and portions of a second output DC power signal to a second group of available power conversion modules. Furthermore, one or more operations may be performed in a contemporaneous or simultaneous manner.

Figure 7:
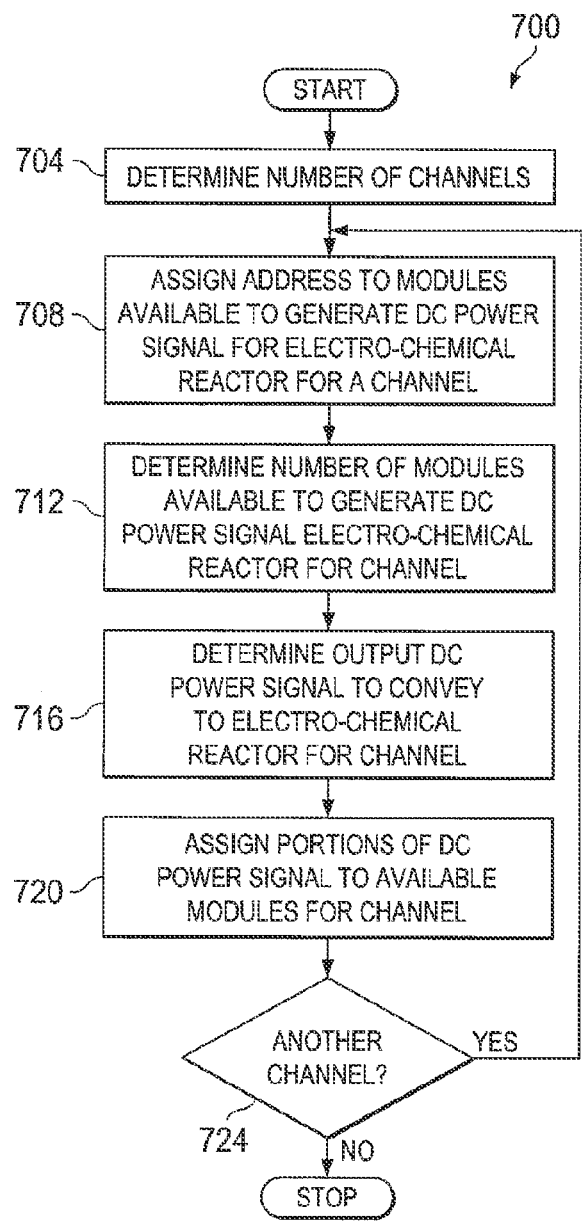
FIG. 7 is a flowchart illustrating selected operations of another example process for generating a DC power signal for an electro-chemical reactor.

FIG. 7 illustrates an example process 700 for generating a DC power signal for an electro-chemical reactor. Process 700 may, for example, be implemented by a system similar to system 100 and may be used with various processes such as process 600. In particular, process 700 may be implemented by a controller similar to controller 180.

Process 700 calls for determining the number of channels for which output DC power signals are to be generated (operation 704). The number of channels may, for example, be determined by receiving user input or instructions from a remote controller.

Process 700 also calls for assigning addresses to power conversion modules available to generate a DC power signal for a channel (operation 708). Assigning addresses to power conversion modules may, for example, be performed by sequentially assigning the addresses to the power conversion modules. As part of this, the power conversion modules may have to be discovered (e.g., through a ping/response protocol).

Process 700 also calls for determining a number of power conversion modules available to generate a DC power signal for a channel (operation 712). The number of modules may, for example, be determined by the number of modules to which addresses have been assigned.

Process 700 additionally calls for determining the output DC power signal to convey to an electro-chemical reactor for a channel (operation 616). The output DC power signal to convey to an electro-chemical reactor for a channel may, for example, be determined by receiving user input or instructions from a remote controller Process 700 also calls for assigning a portion of the output DC power signal for the channel to the available power conversion modules for the channel (operation 720). The output DC power signal may, for example, be apportioned evenly between the available power conversion modules.

Process 700 also calls for determining whether there is another channel for which a DC power output signal is to be generated (operation 720). If there is not another channel for which a DC power output signal is to be generated, process 700 is at an end. If, however, there is another channel for which a DC power output signal is to be generated, process 700 calls for assigning addresses to power conversion modules available to generate a DC power signal for the next channel (operation 724).

Although FIG. 7 discloses a process for generating a DC power signal for an electro-chemical reactor, other processes for generating a DC power signal for an electro-chemical reactor may include fewer, additional, and/or a different arrangement of operations. For example, a process may not include assigning addresses to the available power conversion modules. The addresses could, for example, be set by a user on installation (e.g., through the use of jumpers). As another example, example, a process may not include determining the number of available power conversion modules. The number of available power conversion modules could, for example, be set by a user at the beginning of operation. Furthermore, one or more operations may be performed in a contemporaneous or simultaneous manner.

Figure 8:
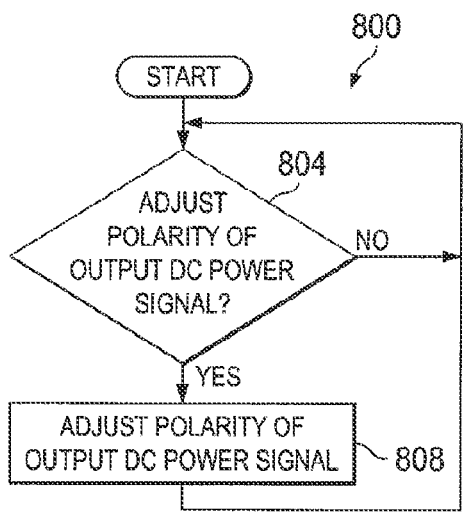
FIG. 8 is a flowchart illustrating selected operations of an additional example process for generating a DC power signal for an electro-chemical reactor.

FIG. 8 illustrates another example process 800 for generating a DC power signal for an electro-chemical reactor. Process 800 may, for example, be implemented by a system similar to system 100 and may be used with various processes such as process 400.

Process 800 calls for determining whether to adjust the polarity of an output DC power signal (operation 804). The DC power signal may, for example, be a combination of DC power signals from a number of power conversion modules. Determining whether to adjust the polarity of an output DC power signal may, for example, be accomplished by determining whether it is time to adjust the polarity or whether a command has been received to adjust the polarity.

If the polarity of the output DC power signal should not be adjusted, process 800 calls for continuing to check whether to polarity should be adjusted. If, however, the polarity of the DC power signal should be adjusted, process 800 calls for adjusting the polarity of the DC power signal (operation 808). A controller external to a polarity reverser may, for example, make this determination and command the polarity reverser to reverse the polarity (e.g., by adjusting the input signals). The polarity may, for example, be adjusted by activating a DPDT switch. Process then calls for again determining whether the polarity should be adjusted.

FIGS. 9A-D illustrate an example system 900 for generating a DC power signal for an electro-chemical reactor. Similar to system 100, system 900 includes a number of power conversion modules 902, with sets of power conversion modules being located on shelves 904.

System 900 includes a housing 910. Housing 910 provides protection to the electronic components in the housing and also protects humans from touching the electronic components, which may be operating at high powers. Housing 910 includes a front panel 911, a side panel 912, a rear panel 914, and a side panel 916. Front panel 911 is pivotally attached to housing 910 to allow access to the electronic components in the housing, such as power conversion modules 902. Thus, the number of power conversion modules 902 may be readily increased or decreased to alter the output power of system 900 as needed. Side panel 912 includes a number of vents 913 to provide airflow for the electronic components in system 900. Rear panel 914 includes pairs of output terminals 915, with one pair of output terminals being associated with each shelf 904. Side panel 916 is pivotally attached to the housing 910 to also allow access to the electronic components in housing 910. Similar to side panel 912, side panel 916 includes a number of vents 917 to allow airflow for the electronic components in system 900. Located inside side panel 916 are a number of fans 919. Fans 919 generate airflow around the electronic components in housing 910 to assist in cooling the electronic components. Fans 919 may be standard cooling fans (e.g., for indoor applications) or specialized fans (e.g., for outdoor applications), such as National Electrical Manufacturers Association (NEMA) Type 3.

Coupled to front panel 911 are a number of user output devices 920 and user input devices 922. In this implementation, user output devices 920 include gauges 920a-b (e.g., d'Arsonval meters) for presenting the voltage and the current of the output power signal. User output devices 920 also include a display 920c for presenting the input parameters to the system 900 (e.g., output voltage to be achieved, output current to be achieved, cycle time, reversal time, number of channels, etc.) and visual annunciators 920d for identifying overall operation mode of system 900 (e.g., output on, voltage limit, or fault). In general, user output devices 920 may include any type of device by which information may be provided to a user User input devices 920 may generally be any devices (e.g., dials, keypads, switches, touchpads, touchscreens, or keyboards) by which a user may input information to system 900. In this implementation, user input devices 920 include a key switch 922a, a rotary switch 922b, a knob 922c, and a rotary switch 922d. Key switch 922a may be used to turn system 900 on/off and to start automatic operation. Rotary switch 922b may be used to select operating modes for system 900 (e.g., output voltage, output amperage, start time, end time, polarity reversal time, etc.). Knob 922c may be used to set operating parameter levels (e.g., output voltage, output amperage, start time, end time, polarity reversal time, etc.) for system 900. For example, when operating in a manual mode, knob 922c may be used to adjust the current being supplied in the output DC power signal. These parameters may reset to their defaults if power is removed from the system. (System 900 can also be operated by a controller, whether located locally or remotely.) Rotary switch 922d may be used to select between different output channels.

After supplying power to system 900, turning key switch 922a to the on position will allow the unit to pre-charge its internal high-voltage busses and be ready for operation. In certain modes of operation, when AC power is supplied to system 900, data should appear on display 920c, the voltage on gauge 920a should move to zero, and the fans 919 should run. The control system will also begin to run and test and identify the individual power conversion modules 902. When this is finished, system 900 is ready to run. In certain implementations, a delay timer may be programmed to insert a delay between turning the key switch on and the activation of the output. During this delay, the output signal is off. External equipment may, for example, use the delay to prepare for the start of the electrochemical process.

To use the polarity reversal, the forward time and the reverse time may be set by rotating rotary switch 922b to the appropriate point and adjusting the time using rotating rotary knob 922c. To disable polarity switching, either forward time or reverse time may be set to zero.

System 900 may have a configuration mode in which parameters may be persistently set. The parameter values may, for example, be saved to non-volatile memory that is retained even if AC power is lost. To enter a configuration mode, a user may, for example, set the key switch to the OFF position and move rotary switch 922b to the top position.

Within the configuration mode, a user may have access to the setting of a number of parameters. Display 920c may, for example, show the parameters values one at a time. The parameters may be scrolled through by adjusting rotary knob 922c. To adjust a parameter value, rotary switch 922b may be adjusted to a demarcated "Adjust" position, and the rotary knob 922c manipulated to adjust the value.

For a multi-channel mode, knob 920d determines which channel is connected to the display devices 910 and which channel can be currently controller using user input devices 920. Polarity reversal may be controlled at the same time for all channels.

Table 3 illustrates example parameters that may be adjusted in a configuration mode.

TABLE 3

| | |
|---|---|
| FORWARD TIME | Although the forward polarity interval is adjustable in normal operation, that value is not normally retained when the AC power is cycled. To change the power-up value of Forward Time adjust this configuration parameter. |
| REVERSE TIME | Although the reverse polarity interval is adjustable in normal operation, that value is not normally retained when the AC power is cycled. To change the power-up value of Reverse Time, adjust this configuration parameter. |
| LOCK REVERSER | If this parameter is set to LOCK, the operator cannot adjust the Forward Time or Reverse Time in normal operation mode. The automatic reverser will still operate, but the operator cannot adjust it. |
| TIMER ENABLED | The second row of the display can be configured to show the voltage or a cycle timer. In plating applications, set this parameter to TRUE. For applications where the voltage needs to be operator adjustable, select FALSE. If this parameter is set to TRUE, the voltage setting comes from the MAX VOLTAGE parameter for each channel. If set to FALSE, the cycle timer function is not available. |
| RESET CURRENT | If this parameter is set to TRUE, then the current setpoint is reset to zero on each transition of the key switch from OFF to ON. If set to FALSE, the current setpoint is retained when the key is turned off, but it is reset to zero if the unit loses AC power. |
| AUTO SETPOINT | Selects the source of the current setpoint when the key switch is in the AUTO position. MANUAL means the front panel ADJUST knob. INTERNAL refers to the built-in controller. EXTERNAL means the 4-20 milliamp input on the back of the control panel. RTU means the 4-20 milliamp input or 0 to 10 volt input on an external control RTU. |
| PLC POLARITY | This parameter changes how the PLC control inputs function when the keyswitch is in AUTO. If this parameter is FALSE, then the Start/Enable input has the Start function and the Stop/Polarity input has the Stop function. If this parameter is TRUE, then these inputs have the Enable and Polarity functions respectively. |
| START DELAY | Establishes a delay between turning on the key switch and energizing the system output. |
| CYCLE TIME | Set the default cycle time which will be loaded at power-up. This setting is ignored unless the TIMER ENABLED parameter is set to TRUE. |
| PRE REV TIME | The system can give an external control system advance notice of a pending polarity reversal. If this time is non-zero, the system will energize the Pre/Post Reverse output for a time surrounding each polarity reversal. This output will energize PRE REV TIME seconds before the reversal and will remain energized for POST REV TIME seconds after the reversal completes. The system can also send this signal to one if its RTU modules. |
| POST REV TIME | See PRE REV TIME |
| BOOST CURRENT | The system can be configured to boost the output current for a specified interval following each polarity reversal. This parameter adjusts the current setting during the boost interval. If the operator has the main current setpoint adjusted higher than this value, no boost will occur. |
| BOOST TIME | The amount of time following each polarity reversal for which the boost current overrides the main setpoint. Refer to BOOST CURRENT. |
| AUTO START | Controls behavior if the key switch is in the ON position when power is applied. If TRUE, the system will start. if FALSE, the key switch must first be switched to OFF, than back to ON. |
| MINIMUM FANS | Set to configure the controller to match the number of fans in the cabinet (e.g., 9, 12, or 24 fans). |
| EXT SET SCALE | This controls the translation of the external setpoint 4 to 20 milliamp input. Four milliamps commands zero amps. Enter the current which is represented by 20 milliamps. |
| CHAN1 MODULES CHAN2 MODULES CHAN3 MODULES CHAN4 MODULES CHAN5 MODULES | To configure a unit for multi-channel operation, the number of modules assigned to each channel must be configured. The modules are assigned to channels starting with the right module on the top shelf and proceeding right to left and top to bottom. Full |

TABLE 3-continued

| | |
|---|---|
| CHAN6 MODULES CHAN7 MODULES CHAN8 MODULES | shelves should be assigned to channels. That is, no single shelf should contain modules belonging to different channels. Generally, the system has no way to verify this important restriction. For a single-channel unit, set all of these parameters to zero and the unit will automatically assign all modules to channel 1. |
| MAX VOLTAGE 1 | This parameter sets the voltage for the first channel on multi-channel units or for all modules of a single-channel unit. The operator can adjust the voltage (unless LOCK VOLTAGE is set) from the front panel, but this parameter sets the power-up value. |
| MAX VOLTAGE 2 through MAX VOLTAGE 8 | Voltage settings for other channels of a multi-channel unit. See MAX VOLTAGE 1 |
| LOCK VOLTAGE | If set to LOCK, prevents the operator from adjusting the voltage during normal operation. The voltage will remain set according to the MAX VOLTAGE parameters, above. |
| COMBINATION 1 | The first number of the combination used to enter configuration mode. If you change the combination, be sure to record the new one. A lost combination cannot be recovered and the default combination can only be reset at the factory. |
| COMBINATION 2 | Second number of the configuration mode combination. |
| COMBINATION 3 | Third number of the configuration mode combination. |
| EXIT SETUP | This parameter has no value. "Save" it to exit the configuration mode and return to normal operation. |

To stop output, the output current may be adjusted to zero or the key switch 922a may be turned to off. If the key switch 922a is set to on but the other manual setpoints are zero, there will be no output, but the internal busses may remain charged, ready to supply output power again without delay. When the key switch 922a is turned to off, the internal busses will be deenergized, although this may take some time (e.g., up to 30 s).

System 900 may include a printed circuit board (PCB) on the back of front panel 911. The PCB may have controls for the front panel and connectors for internal connections within the system and/or external connections for interfacing other systems, such as a PLC or other control system. Table 4 lists example connectors that may be on such a PCB.

TABLE 4

| | |
|---|---|
| USB | Temporary connection to a personal computer to download a ladder diagram. This connection can also be used to update the system's internal firmware. System operation may stop when a USB cable is connected. |
| Expansion Network | Connection for a Category 5 or Category 6 cable to external I/O expansion accessories including remote terminals, data loggers, of a Web interface. |
| Start/Enable Input | Apply signal (e.g., 24 V DC) to start the system when the key switch is in the AUTO position. Depending on the PLC POLARITY configuration parameter, this input can be momentary or sustained to keep the system running. |
| Stop/Polarity Input | If the PLC POLARITY parameter is FALSE, this input should be energized for the system to run and de-energizing it momentarily will unlatch the Start input. If the PLC POLARITY parameter is TRUE, then energizing this input commands the system to switch polarity. The built-in timer reverser should be disabled tin the configuration parameters. |
| Volt Limit Output | The system output a signal (e.g., 24 V DC) when it is operating in voltage limit. |
| 4-20 mA Setpoint Input | When the key switch is in AUTO, and the AUTO SETPOINT configuration parameter is set to EXTERNAL, this input controls the system output current. 4 mA commands 0 A output. The full scale current commanded by 20 mA is configurable. |

TABLE 4-continued

| | |
|---|---|
| Interlock Loop | These connections are used for internal interlock switches. Opening this circuit will stop the system with an INTERLOCK fault. Normally-closed external switches and relays can be interposed into this circuit; however, it is recommended that these connection be made to the pre-charge tray terminal block. |
| Running Output | The system output a signal (e.g., 24 V DC) when it is running, although the setpoint may be 0. |
| Pre/Post Reverse Output | The system can be configured to warn external equipment of a pending polarity reversal. See the PRE REV TIME and POST REV TIME configuration parameters. |
| Return | Connect the negative side of the 24 V DC power supply. Multiple terminals may be provided for convenience—they are connected together internally. |

Figure 9A:
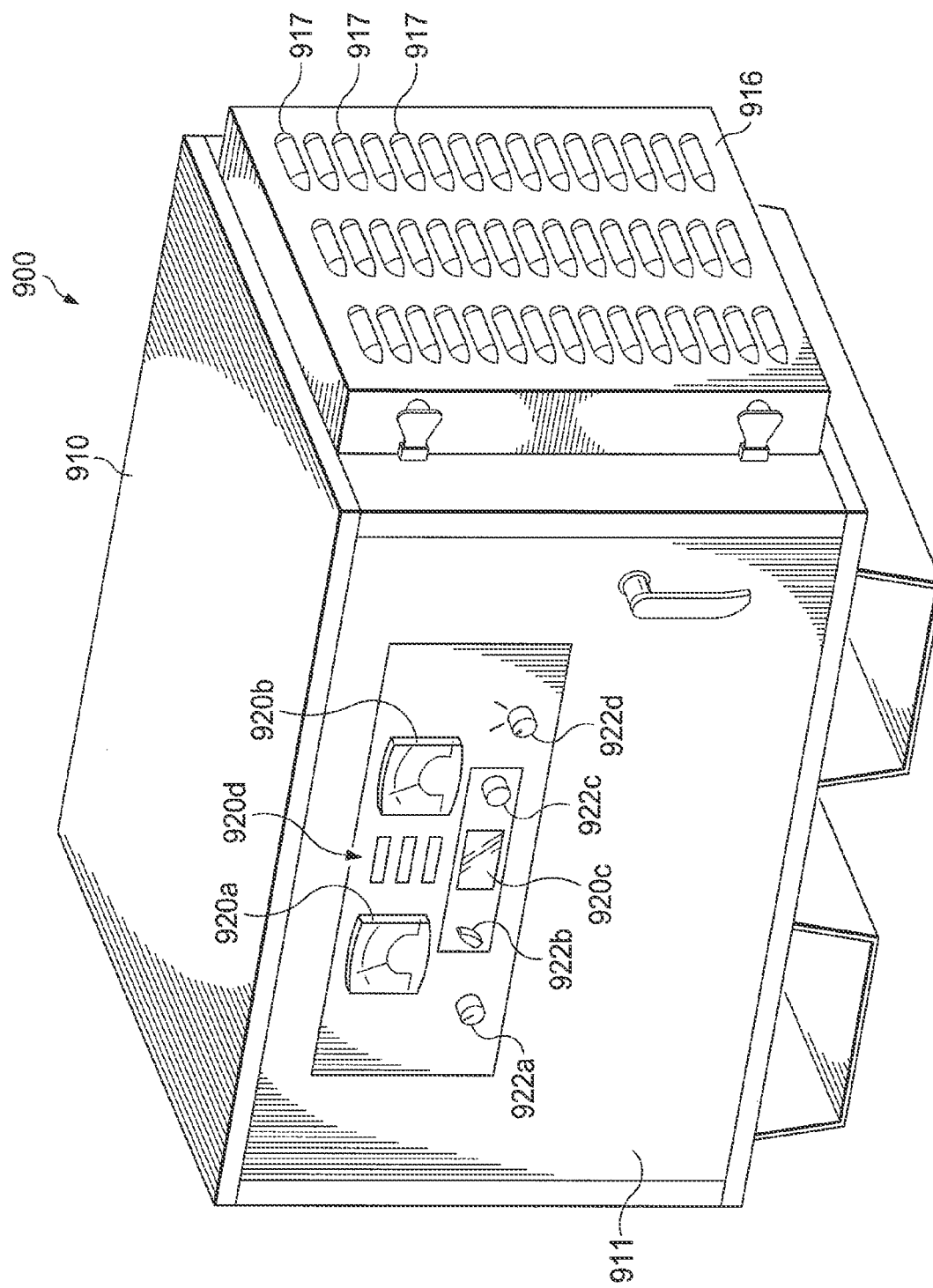
FIGS. 9A-D are illustrations of an example system for generating a DC power signal for an electro-chemical reactor.
Figure 9B:
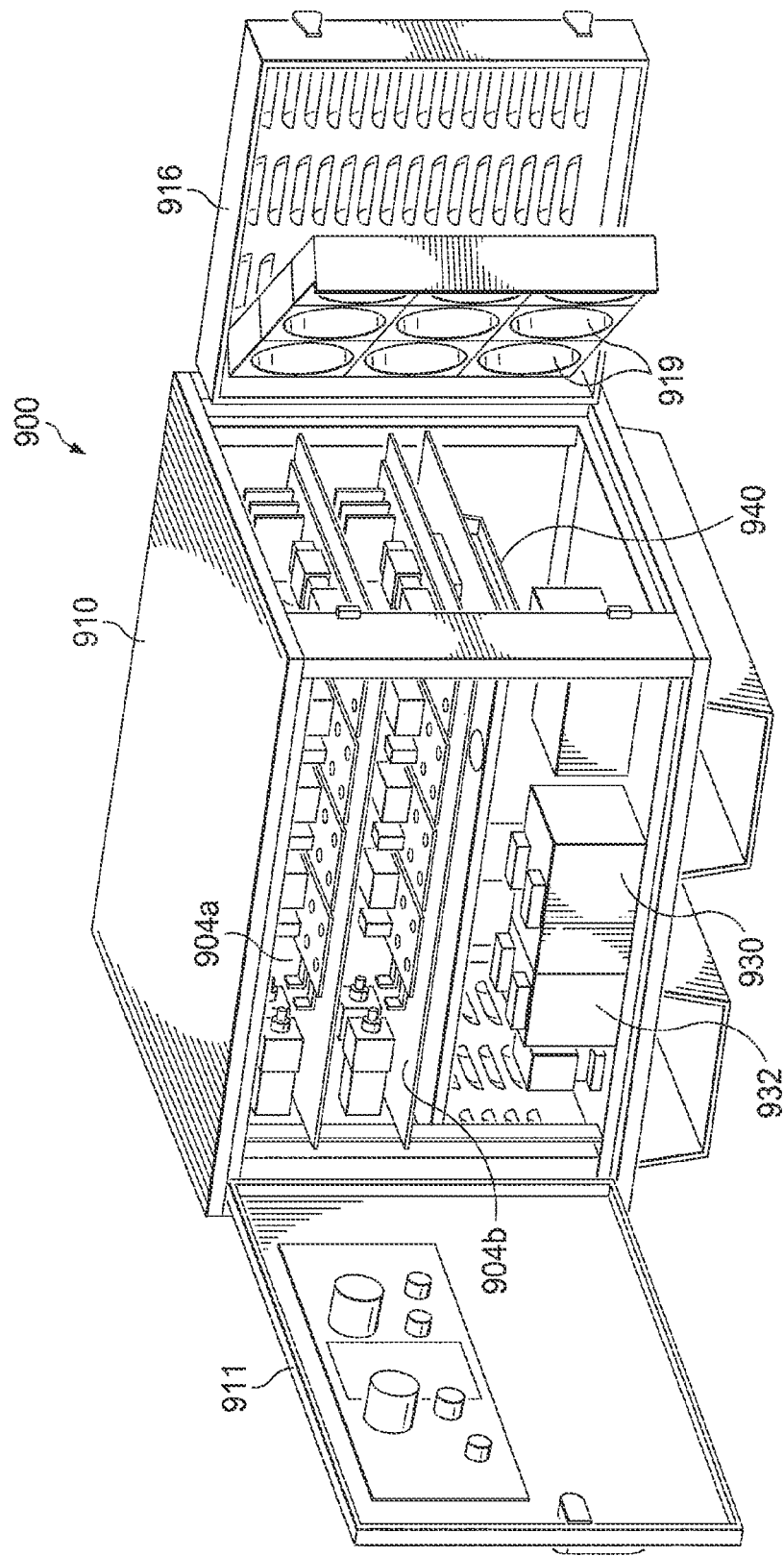
Figure 9C:
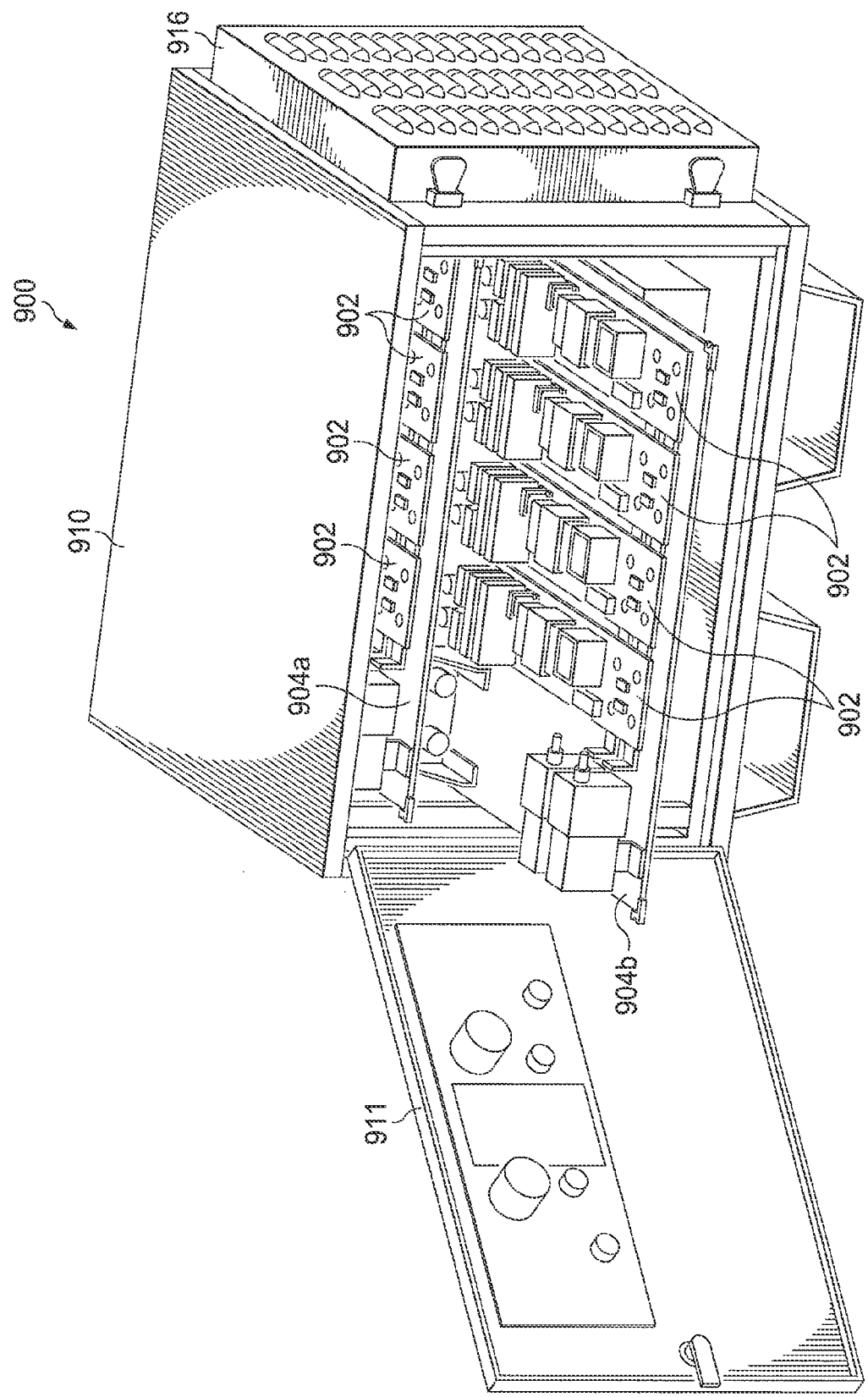
Figure 9D:
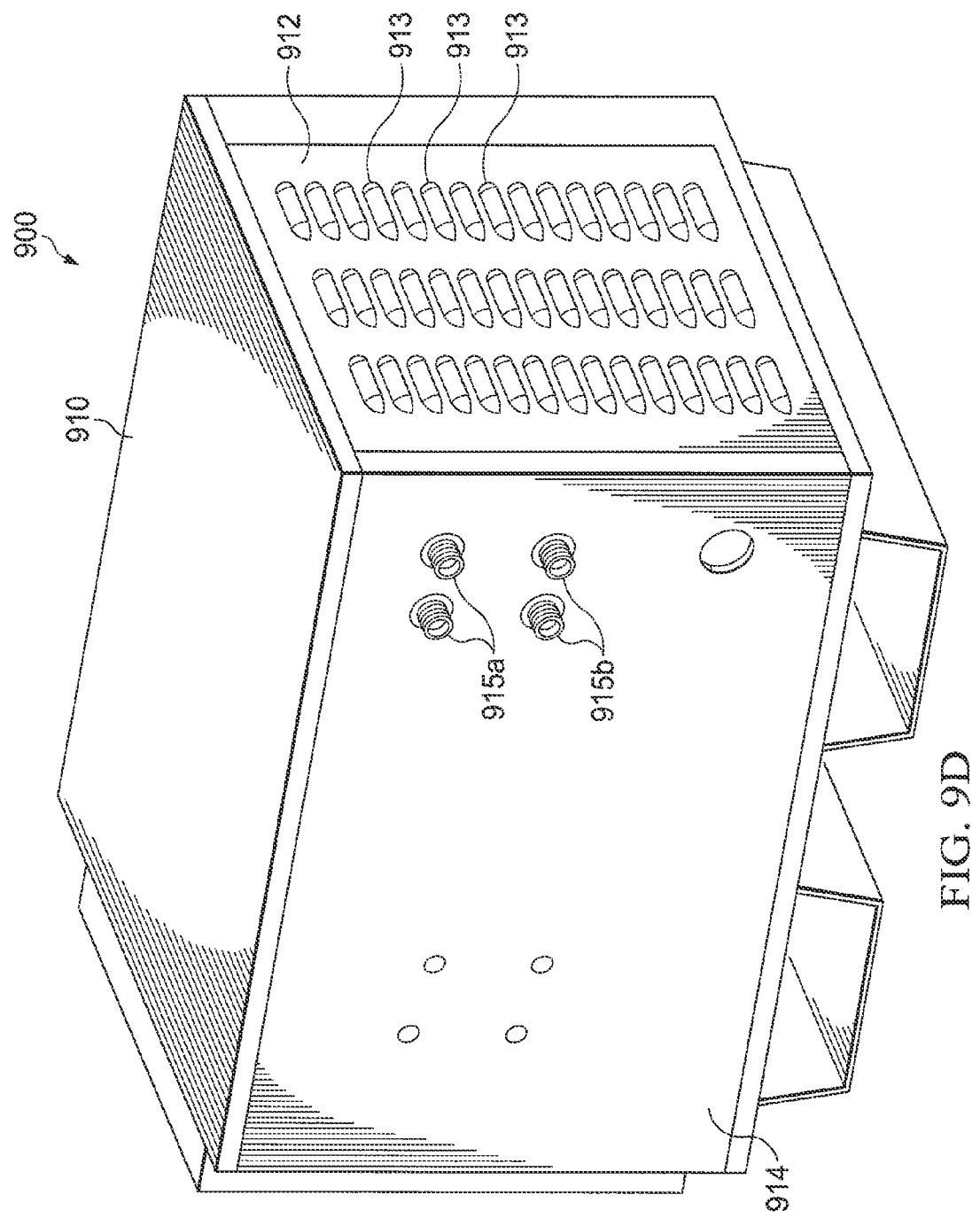

As mentioned previously, power conversion modules 902 are grouped together on shelves 904. The power conversion modules on a shelf 904 may operate together in a single channel or multiple shelves may be grouped together for a channel. Housing 910 is adapted to allow each shelf 904 to be slid into and out of the housing, as best seen in FIG. 9C. Thus, a shelf may be removed to allow a power conversion module 902 to be replaced and/or the number of power conversion modules 902 to be adjusted.

System 900 also includes an AC-DC converter 930. AC-DC converter 930 converts input AC power (e.g., standard commercial power) into a high voltage DC signal that is supplied to shelves 904 on bus bars 940 (only one of which is viewable). AC-DC converter may, for example, be a rectifier (e.g., a diode bridge).

System 900 also includes a pre-charge unit 932. Pre-charge unit is responsible for limiting the inrush of current as the capacitors initially charge. The pre-charge assembly may be activated before the full operation of AC-DC convertor 930 to allow capacitors to charge before beginning full operation. The pre-charge assembly may, for example, include a set of resistors in series that limit the inrush current as the capacitors initially charge. Once the capacitors are charged, a relay may shunt the resistors so that they do not continue to dissipate power.

System 900 has a variety of features. For example, by having a variety of user output devices, a user may readily understand what is happening with the system. As another example, by having a variety of user input devices, a user may be able to control various aspects of the system. As an additional example, by being able to add and remove shelves, the number of power conversion modules may be adjusted. Moreover, the number of power conversion modules may be readily adjusted on each shelf. Thus, the available output power for system 900 may be readily adjusted. As another example, by having multiple pairs of output connectors 915, the connectors may be commonly available connectors (e.g., Cam-Lok "F" series plugs). If output from multiple shelves is needed, cables could be run from each output connector pair 915 to the load and paralleled on the load end. In other implementations, a pair of connectors could support the full output current (e.g., 0 to 800 Amps), but they could be relatively expensive and unwieldy. Having multiple pairs of output connectors 915 also allows multiple output channels to exist, with one output connector pair 915 being dedicated to each channel. (In implementations with more than two shelves, a channel may consist of multiple shelves with their outputs paralleled at the load end.).

Figure 10:
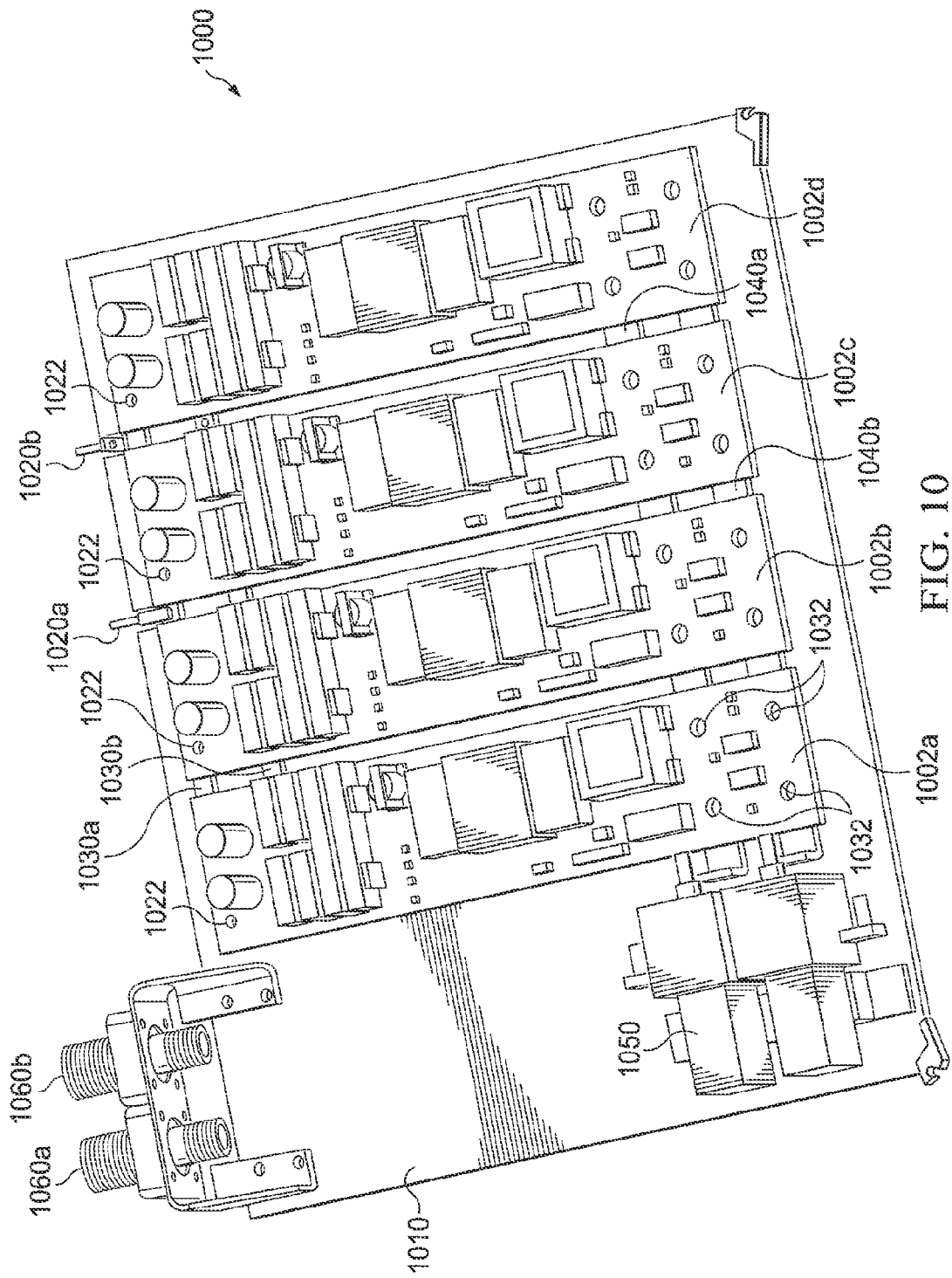
FIG. 10 is an illustration of selected components for another system for generating a DC power signal for an electro-chemical reactor.

FIG. 10 illustrates an example system 1000 for generating a DC power signal for an electro-chemical reactor. As illustrated, system 1000 includes a number of power conversion modules 1002 that are mounted on a shelf 1010, which is a type of mounting structure. Shelf 1010 also includes a pair of input connectors 1020, a pair of input bus bars 1030, a pair of output bus bars 1040, a polarity reverser 1050, and a pair of output connectors 1060.

Input connectors 1020 are adapted to couple to a bus (e.g., vertical bars on the back of a cabinet). One of input connectors 1020 carries the positive side of a DC signal, and the other of input connectors 1020 carries the negative side of the DC signal. Input connectors 1020 are coupled to input bus bars 1030 to deliver the DC signal thereto. As illustrated, input connector 1020a is coupled directly to input bus bar 1030a, and input connector 1020b is coupled to input bus bar 1030b on the underside of shelf 1010.

Input bus bars 1020 convey the input DC signal to power conversion modules 1002, which are responsible for each generating a portion of an output DC power signal. Input bus bar 1020 contains apertures 1022 therein (only some of which can be seen) to allow power conversion modules 1000 to be secured (e.g., bolted) to shelf 1010. In particular implementations, apertures 1022 are threaded to allow power conversion modules 1002 to be bolted directly thereto.

At the other end, power conversion modules are coupled to output bus bars 1040. Output bus bars 1040 receive the portion of the output DC power signal from each of power conversion modules 1000 and combine the signal into the output DC power signal. One of output bus bars 1040 carries the positive side of the output DC power signal, and the other carries the negative side of the DC power signal. Output bus bars 1030 contain apertures 1032 therein to allow power conversion modules 1000 to be secured (e.g., bolted) to shelf 1010. In particular implementations, apertures 1032 are threaded to allow power conversion modules 1002 to be bolted directly thereto.

Allowing power conversion modules 1002 to be secured to shelf 1010 individually allows the power conversion modules to be added or subtracted readily. Thus, the power that can be generated by system 1000 may be readily adjusted.

Output bus bars 1040 are coupled to polarity reverser 1050. Polarity reverser 1050 is responsible for reversing the polarity of the output DC power signal at various times.

Output connectors 1060 are coupled to polarity reverser 1050 on the underside of shelf 1010. Output connectors 1060 thus receive the output DC power signal from the output connectors 1060 and convey it to an electro-chemical reactor.

In particular implementations, each power conversion module 1002 may include one or more annunciators (e.g., LEDs) that provide an indication of it status. For example, the annunciator(s) for a power conversion module may light green, yellow, and red.

A green annunciator may indicate that the module is functioning and working in a normal mode.

A yellow annunciator may indicate that the module is functioning but is not in a normal mode. For example, a yellow annunciator may indicate that the module is operating at its voltage limit. That is, the resistance of the load is high enough that the setpoint current cannot be delivered without exceeding the voltage setpoint. The module is still operational, but only outputting the limit voltage.

A red annunciator may indicate a fault with the module. If the fault is an over-heat condition, allowing the system to cool off will remedy the problem. Other faults are likely to require the module to be replaced.

At power up, the annunciator(s) may light red until the control system identifies and configures the module. Thereafter, it should light green or yellow.

A number of implementations for generating a DC power signal for an electro-chemical reactor have been discussed, and several others have been mentioned or suggested. Those skilled in the art, however, will readily recognize that a variety of additions, deletions, substitutions, and modifications may be made while still achieving a DC power signal for an electro-chemical reactor. Thus, the scope of the protected matter should be judged based on the following claims, which may capture one or more aspects of one or more implementations.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A system for converting alternating current power to direct current power for an electro-chemical reactor, the system comprising:
   an input electrical connector adapted to receive an alternating current power signal;
   a convertor adapted to convert the alternating current power signal to a direct current signal;
   at least one power conversion module, each power conversion module comprising:
   a convertor for converting a portion of the direct current signal to a high-frequency alternating current signal;
   a transformer adapted to adjust the voltage of the high-frequency alternating current signal;
   a convertor adapted to convert the voltage-adjusted high-frequency alternating current signal to a direct current power signal; and
   a filter adapted to filter the direct current power signal;
   a mounting structure adapted to receive a plurality of the power conversion modules;
   a first bus adapted to distribute the direct current signal from the alternating current to direct current convertor to the power conversion modules;
   a second bus adapted to receive the direct current power signals from the power conversion modules and combine the signals into an output direct current power signal;
   an output electrical connector for conveying the output direct current power signal to an electro-chemical reactor; and
   a polarity reverser adapted to reverse the polarity of the output direct current power signal,
   wherein the polarity reverser reverses the polarity of the output direct current power signal at a prescribed time and for a prescribed duration.

2. The system of claim 1, wherein the mounting structure comprises a housing adapted to receive a plurality of power conversion modules.

3. The system of claim 2, wherein the mounting structure further comprises a shelf adapted to receive a plurality of power conversion modules, and the housing is adapted to receive the shelf.

4. The system of claim 3, wherein the shelf comprises a pair of bus bars, the bus bars comprising threaded apertures to which one or more power conversion modules may be bolted.

5. The system of claim 3, wherein the housing is adapted to receive a number of shelves, each shelf adapted to receive a number of power conversion modules.

6. The system of claim 5, further comprising an electrical output connector for each shelf.

7. A system for converting alternating current power to direct current power for an electro-chemical reactor, the system comprising:
   an input electrical connector adapted to receive an alternating current power signal;
   a convertor adapted to convert the alternating current power signal to a direct current signal;
   at least one power conversion module, each power conversion module comprising:
   a convertor for converting a portion of the direct current signal to a high-frequency alternating current signal;
   a transformer adapted to adjust the voltage of the high-frequency alternating current signal;
   a convertor adapted to convert the voltage-adjusted high-frequency alternating current signal to a direct current power signal; and
   a filter adapted to filter the direct current power signal;
   a mounting structure adapted to receive a plurality of the power conversion modules;
   a first bus adapted to distribute the direct current signal from the alternating current to direct current convertor to the power conversion modules;
   a second bus adapted to receive the direct current power signals from the power conversion modules and combine the signals into an output direct current power signal; and
   an output electrical connector for conveying the output direct current power signal to an electro-chemical reactor, wherein each power conversion module comprises a controller, each controller adapted to determine the amount of power to be generated by the associated power conversion module and to control the direct current to alternating current convertor to generate the high-frequency alternating current signal.

8. The system of claim 7, wherein each controller is further adapted to monitor the direct current power signal being generated by the associated power conversion module and to adjust the alternating current signal based on the generated signal.

9. The system of claim 8, wherein each controller is further adapted to limit the direct current power signal being produced by the associated power conversion module and to generate a user alert if the limit is reached.

10. A system for converting alternating current power to direct current power for an electro-chemical reactor, the system comprising:
    an input electrical connector adapted to receive an alternating current power signal;
    a convertor adapted to convert the alternating current power signal to a direct current signal;
    at least one power conversion module, each power conversion module comprising:
    a convertor for converting a portion of the direct current signal to a high-frequency alternating current signal;
    a transformer adapted to adjust the voltage of the high-frequency alternating current signal;
    a convertor adapted to convert the voltage-adjusted high-frequency alternating current signal to a direct current power signal; and
    a filter adapted to filter the direct current power signal;
    a mounting structure adapted to receive a plurality of the power conversion modules;

a first bus adapted to distribute the direct current signal from the alternating current to direct current convertor to the power conversion modules;

a second bus adapted to receive the direct current power signals from the power conversion modules and combine the signals into an output direct current power signal;

an output electrical connector for conveying the output direct current power signal to an electro-chemical reactor; and a master controller communicatively coupled to the available power conversion modules and adapted to:

determine the total output power signal for the system; and assign portions of the total output power signal to the available power conversion modules.

11. The system of claim 10, wherein the master controller is further adapted to determine the number of power conversion modules that are available.

12. The system of claim 11, wherein the master controller is further adapted to discover and assign addresses to the power conversion modules.

13. The system of claim 11, wherein the master controller is further adapted to divide the available power conversion modules into at least two groups and assign a first output power to the first group and a second output power to the second group.

14. A method performed in a power convertor for converting alternating current power to direct current power for an electro-chemical reactor, the method comprising:

receiving an alternating current power signal;

converting the alternating current power signal to a direct current signal;

distributing the direct current signal to at least two power conversion modules coupled to a mounting structure, each power conversion module converting a portion of the direct current signal to a high-frequency alternating current signal, adjusting the voltage of the high-frequency alternating current signal, converting the voltage-adjusted high-frequency alternating current signal to a direct current power signal, and filtering the direct current power signal;

combining the direct current power signals from the power conversion modules into an output direct current power signal for an electro-chemical reactor;

determining, using one or more processors, the amount of power to be generated by the associated power conversion module; and controlling the conversion of direct current signal to the high-frequency alternating current signal.

15. A method performed in a power convertor for converting alternating current power to direct current power for an electro-chemical reactor, the method comprising:

receiving an alternating current power signal;

converting the alternating current power signal to a direct current signal;

distributing the direct current signal to at least two power conversion modules coupled to a mounting structure, each power conversion module converting a portion of the direct current signal to a high-frequency alternating current signal, adjusting the voltage of the high-frequency alternating current signal, converting the voltage-adjusted high-frequency alternating current signal to a direct current power signal, and filtering the direct current power signal;

combining the direct current power signals from the power conversion modules into an output direct current power signal for an electro-chemical reactor;

monitoring, using one or more processors, the direct current power signal being generated by the associated power conversion module; and adjusting the high-frequency alternating current signal based on the generated signal.

16. A method performed in a power convertor for converting alternating current power to direct current power for an electro-chemical reactor, the method comprising:

receiving an alternating current power signal;

converting the alternating current power signal to a direct current signal;

distributing the direct current signal to at least two power conversion modules coupled to a mounting structure, each power conversion module converting a portion of the direct current signal to a high-frequency alternating current signal, adjusting the voltage of the high-frequency alternating current signal, converting the voltage-adjusted high-frequency alternating current signal to a direct current power signal, and filtering the direct current power signal;

combining the direct current power signals from the power conversion modules into an output direct current power signal for an electro-chemical reactor;

limiting, using one or more processors, the direct current power signal being produced by the associated power conversion module; and generating a user alert if the limit is reached.

17. A method performed in a power convertor for converting alternating current power to direct current power for an electro-chemical reactor, the method comprising:

receiving an alternating current power signal;

converting the alternating current power signal to a direct current signal;

distributing the direct current signal to at least two power conversion modules coupled to a mounting structure, each power conversion module converting a portion of the direct current signal to a high-frequency alternating current signal, adjusting the voltage of the high-frequency alternating current signal, converting the voltage-adjusted high-frequency alternating current signal to a direct current power signal, and filtering the direct current power signal;

combining the direct current power signals from the power conversion modules into an output direct current power signal for an electro-chemical reactor;

determining, using one or more processors, the total output power signal; and assigning portions of the total output power signal to the available power conversion modules.

18. The method of claim 17, further comprising determining the number of power conversion modules that are available.

19. A method performed in a power convertor for converting alternating current power to direct current power for an electro-chemical reactor, the method comprising:

receiving an alternating current power signal;

converting the alternating current power signal to a direct current signal;

distributing the direct current signal to at least two power conversion modules coupled to a mounting structure, each power conversion module converting a portion of the direct current signal to a high-frequency alternating current signal, adjusting the voltage of the high-frequency alternating current signal, converting the voltage-adjusted high-frequency alternating current signal to a direct current power signal, and filtering the direct current power signal;

combining the direct current power signals from the power conversion modules into an output direct current power signal for an electro-chemical reactor;

determining, using one or more processors, a number of power conversion modules available for a first channel and available for a second channel; and assigning portions of a first output power signal to the modules available for the first channel and portions of a second output power signal to the modules available for the second channel.

* * * * *